(12) United States Patent
Crocco et al.

(10) Patent No.: US 11,803,953 B2
(45) Date of Patent: Oct. 31, 2023

(54) MANUFACTURING QUALITY IMPROVEMENT THROUGH STATISTICAL ROOT CAUSE ANALYSIS USING CONVOLUTION NEURAL NETWORKS

(71) Applicant: dpiX, LLC, Colorado Springs, CO (US)

(72) Inventors: Jerome David Crocco, Colorado Springs, CO (US); Paul R. O'Hern, Jr., Colorado Springs, CO (US)

(73) Assignee: dpiX, LLC, Colorado Springs, CO (US)

( * ) Notice: Subject to any disclaimer, the term of this patent is extended or adjusted under 35 U.S.C. 154(b) by 1430 days.

(21) Appl. No.: 15/938,815

(22) Filed: Mar. 28, 2018

(65) Prior Publication Data

US 2018/0293722 A1 Oct. 11, 2018

Related U.S. Application Data

(60) Provisional application No. 62/483,849, filed on Apr. 10, 2017.

(51) Int. Cl.

| | | |
|---|---|---|
| *G06T 7/00* | (2017.01) |
| *G06F 11/07* | (2006.01) |
| *G06N 5/046* | (2023.01) |
| *G06N 20/00* | (2019.01) |
| *G06N 3/08* | (2023.01) |
| *G06V 10/98* | (2022.01) |
| *G06V 10/82* | (2022.01) |
| *G06F 18/24* | (2023.01) |
| *G06N 3/045* | (2023.01) |

(52) U.S. Cl.
CPC .......... *G06T 7/0004* (2013.01); *G06F 11/079* (2013.01); *G06F 18/24* (2023.01); *G06N 3/045* (2023.01); *G06N 3/08* (2013.01); *G06N 5/046* (2013.01); *G06N 20/00* (2019.01); *G06V 10/82* (2022.01); *G06V 10/993* (2022.01); *G06T 2207/20081* (2013.01); *G06T 2207/20084* (2013.01); *G06T 2207/30108* (2013.01)

(58) Field of Classification Search
CPC ........ G06T 7/0004; G06T 2207/20081; G06T 2207/20084; G06T 2207/30108; G06F 11/079; G06K 9/6267; G06N 3/0454; G06N 3/08; G06N 5/046; G06N 20/00; G06V 10/993; G06V 10/82
See application file for complete search history.

(56) References Cited

U.S. PATENT DOCUMENTS

| | | | | |
|---|---|---|---|---|
| 5,544,256 | A | * | 8/1996 | Brecher ............... G06T 7/0006 706/900 |
| 2005/0002560 | A1 | * | 1/2005 | Yamamoto ........... G06T 7/0004 382/156 |
| 2006/0142971 | A1 | * | 6/2006 | Reich ..................... H01L 22/20 716/112 |

FOREIGN PATENT DOCUMENTS

| | | | | | |
|---|---|---|---|---|---|
| CN | 1103978 | A | * | 6/1995 | ............. G06T 7/001 |
| JP | 2008171000 | A | * | 7/2008 | ........... G02F 1/1309 |

* cited by examiner

*Primary Examiner* — Zhitong Chen
(74) *Attorney, Agent, or Firm* — Slater Matsil, LLP

(57) ABSTRACT

A quality improvement method for an image sensor array includes collecting in-line optical inspection data of the image sensor, collecting end of line electrical data of the image sensor, creating defect maps and obtaining x-y coordinates of the optical inspection data and the electrical data, correlating the defect maps to generate correlated defects, classifying the images of the correlated defects, and generating root cause statistics of the classified correlated defects.

16 Claims, 33 Drawing Sheets

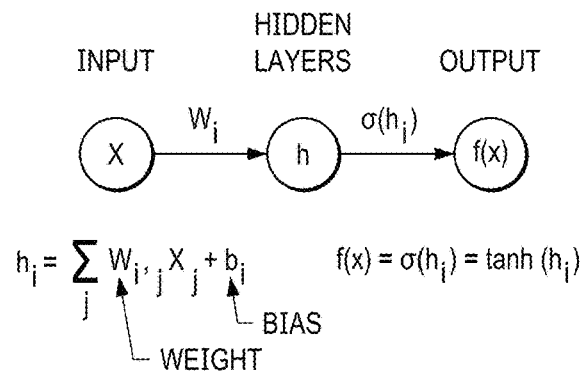
FIG. 1A
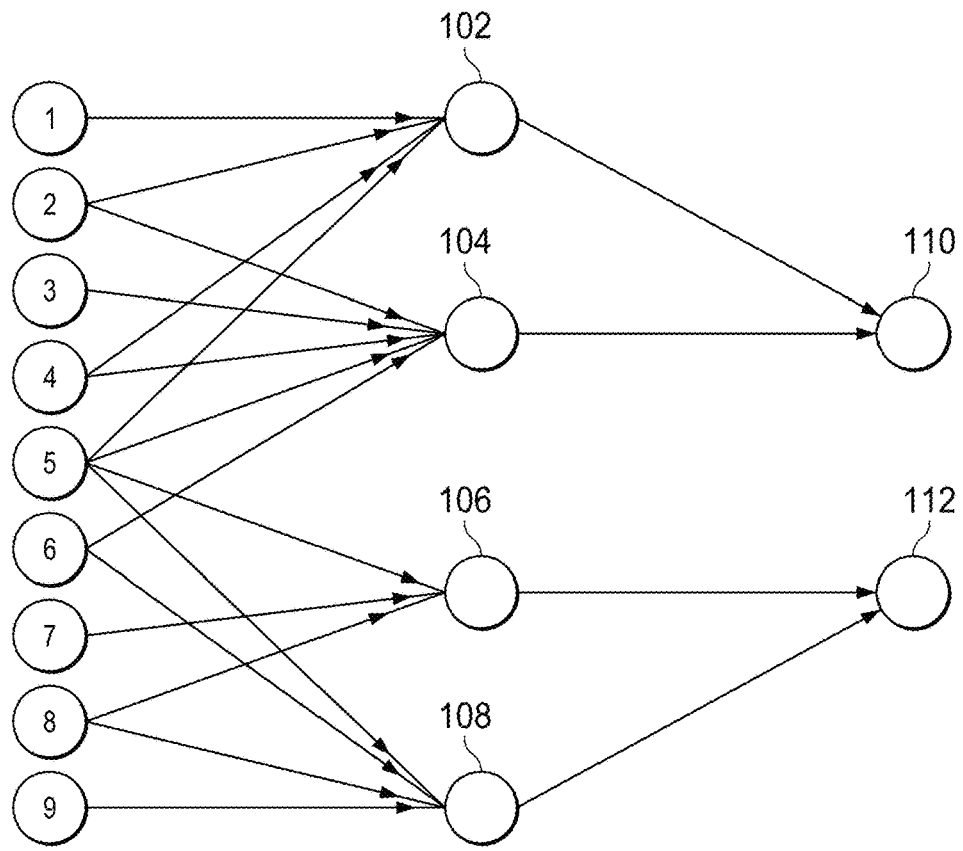
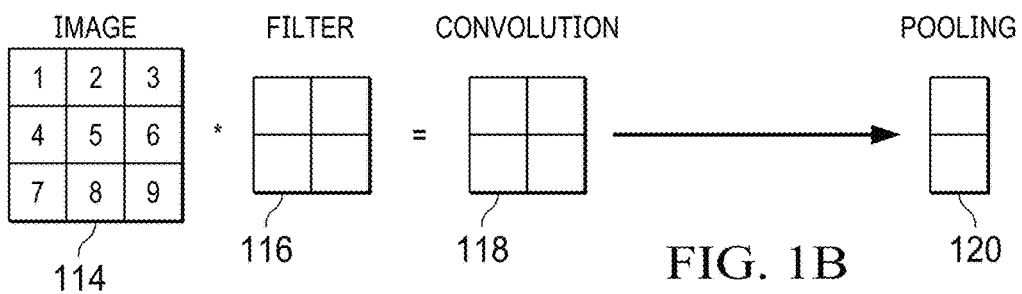
FIG. 1B

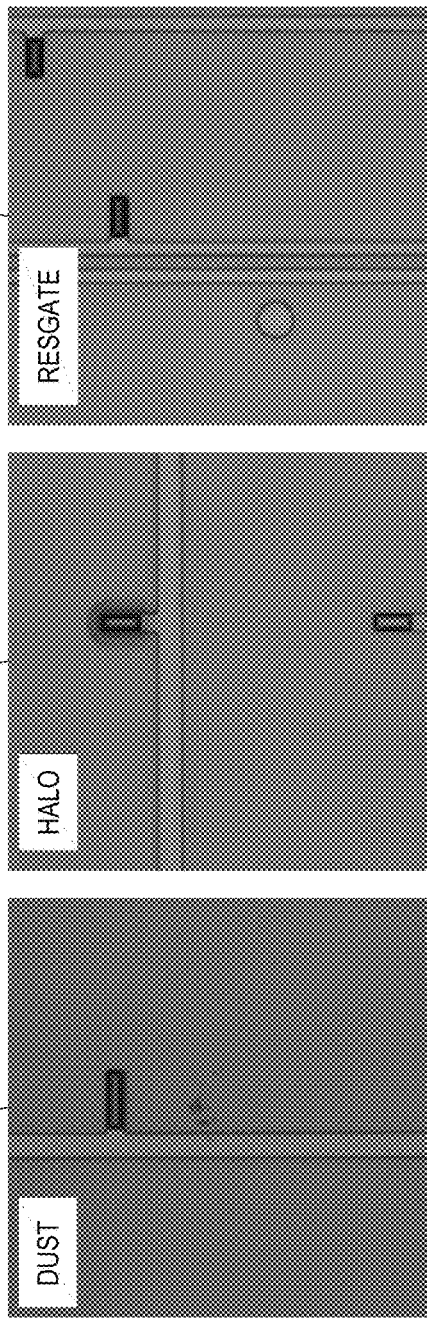
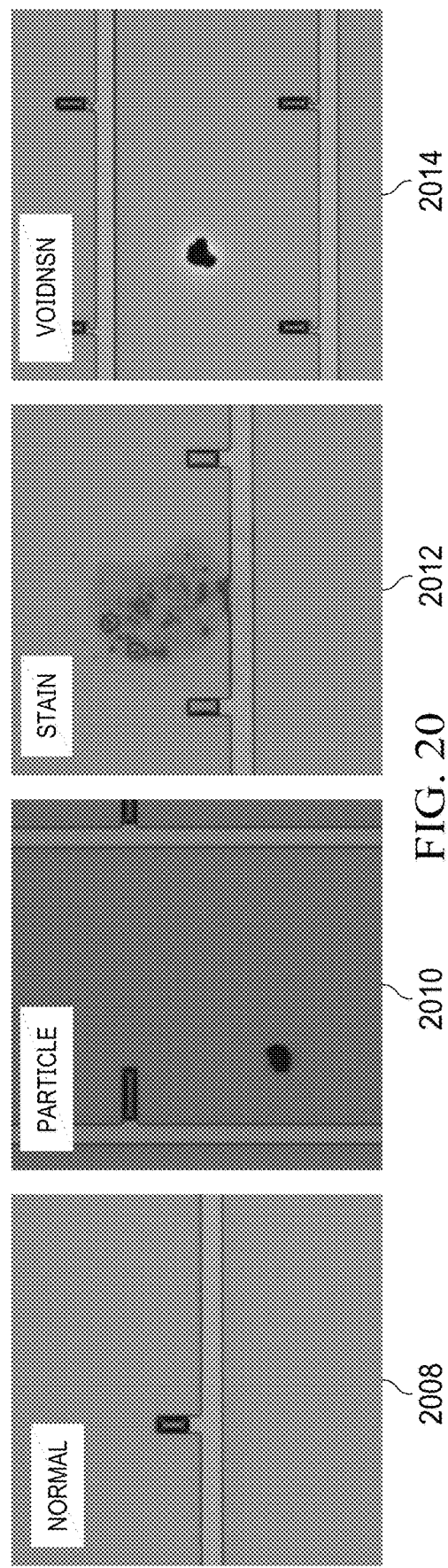
FIG. 20

- EXAMPLE OF PIXEL LEAKAGE IMAGE
- WHITE PIXELS ARE PIXELS WHICH ARE HAVING A HIGH DIODE LEAKAGE

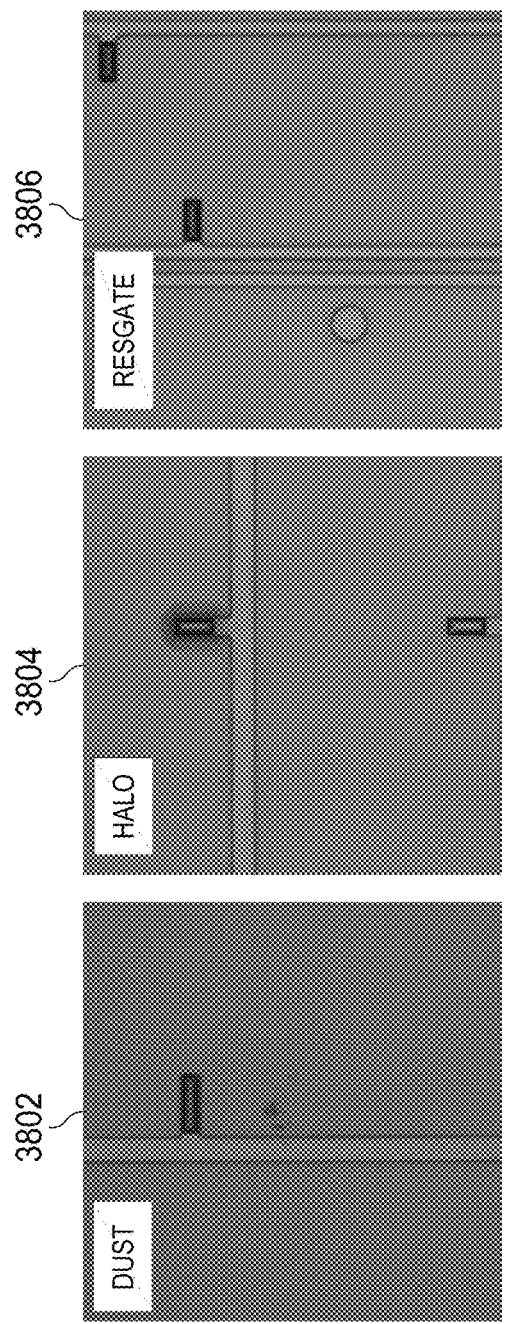
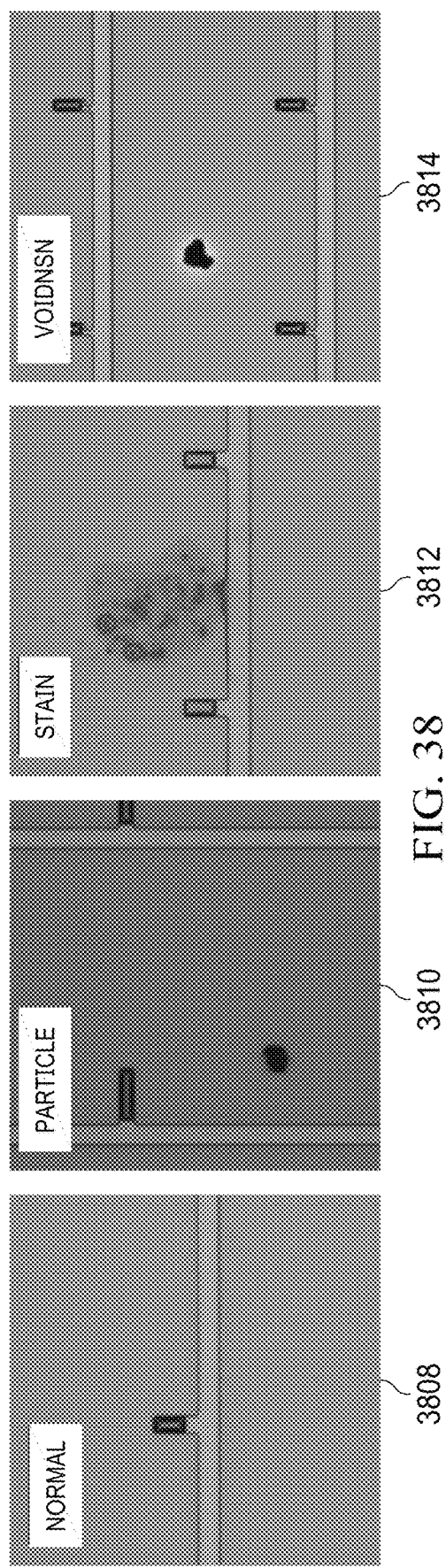
FIG. 38

MANUFACTURING QUALITY IMPROVEMENT THROUGH STATISTICAL ROOT CAUSE ANALYSIS USING CONVOLUTION NEURAL NETWORKS

CROSS-REFERENCE TO RELATED APPLICATIONS

This application claims the benefit of U.S. Provisional Application No. 62/483,849, filed on Apr. 10, 2017, which application is hereby incorporated herein by reference.

TECHNICAL FIELD

The present invention relates generally to a system and method for manufacturing quality improvement through statistical root cause analysis using convolution neural networks.

BACKGROUND

The manufacturing process of a sensor array is typically comprised of a series of cycles wherein (a) thin films of material are deposited onto a substrate, (b) a protective lithographic mask is applied to the deposited material, and (c) the remaining material not covered by the lithographic mask is subsequently removed or etched. This process of thin film deposition, lithographic coating, and etching, results in a thin film of material whose geometry is determined by the design of the lithographic mask. The use of various lithographic masks in conjunction with the wide range of electronic materials provides the capacity to form complex device architectures with characteristics suitable for various applications.

At this micro- and sub-microscopic level, objects such as particles, flakes, or dust begin to impact on the congruence between the physical dimensions of the desired features and its lithographic design. For example, particles may fall on the substrate during thin film deposition causing voids in the metal gate or data transmission lines. One consequence of this may be that the continuity the gate or data line is interrupted and is effectively "open". Other defects include clusters of defective pixels, pixels which exhibit excessive leakage, noise, or low sensitivity for example.

SUMMARY

According to an embodiment, a quality improvement method for an image sensor array comprises collecting in-line optical inspection data of the image sensor; collecting end of line electrical data of the image sensor; creating defect maps and obtaining x-y coordinates of the optical inspection data and the electrical data; correlating the defect maps to generate correlated defects; classifying the images of the correlated defects; and generating root cause statistics of the classified correlated defects.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A is a simplified form of a Neural Network comprising an Input Layer, a Hidden Layer, and an Output Layer;

FIG. 1B is a more detailed form of a Neural Network comprising a plurality of input layers, a plurality of hidden layers, and two output layers;

FIGS. 17-21 show images of various classifications bins, according to embodiments;

FIGS. 35-39 show images of various classifications bins, according to embodiments;

DETAILED DESCRIPTION OF ILLUSTRATIVE EMBODIMENTS

Figure 2:
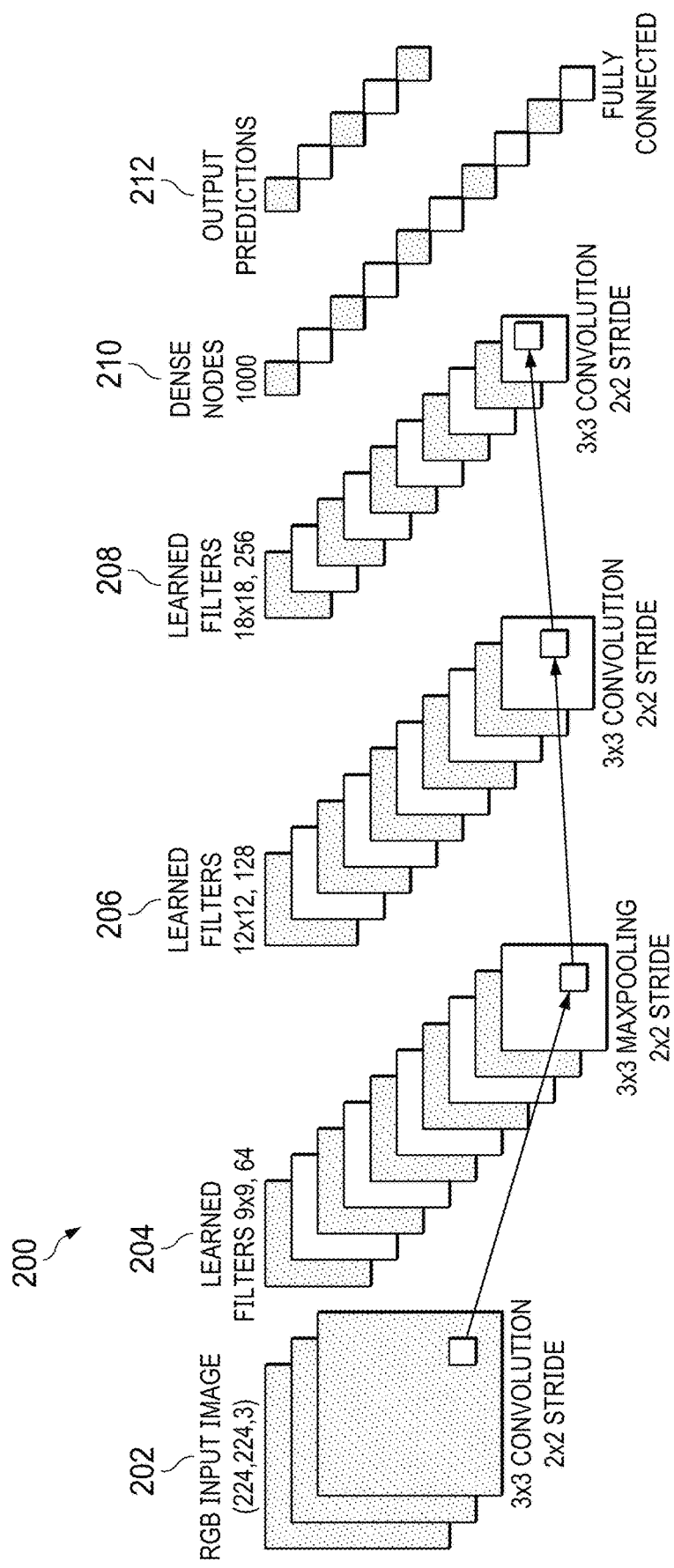
FIG. 2 is a An example of a "Deep" CNN having several hidden units.

Functional test data, including defect maps is described below.

To evaluate the performance of the Imaging arrays, Image Defect Maps may be generated from functional test data at the end of the manufacturing cycle. For a given manufacturing line, these defects maps will typically be specific to a product specification and may be used to determine a pass/fail criterion for manufactured products. For imaging arrays which have failed, the defect maps provide precise pixel coordinates which do not meet the product specifications. For example this may include pixels which exhibit a high leakage current density, thin film transistors which exhibit a high/low resistance, or clusters of pixels which are not functioning properly.

Automatic (optical) inspection is described below.

In order to assess root cause failure of an imaging array, those pixels which have been flagged in the generated defect map are investigated. For this reason, advanced Automated Optical Inspection ("AOI") systems have been developed for capturing the microscopic images of said defects. Indeed AOI systems are highly efficient tools for process and quality improvements and are capable of detecting microdefects in the thin film manufacturing process. For this reason it is common to find AOI inspection steps staggered throughout a manufacturing process flow to detect and identify catastrophic defects. However, the quantity of data which is captured by an AOI tool is significant and requires substantial human expertise for analyzing and understanding the acquired data. Furthermore, how each defect which has been captured by the AOI may influence the final product performance requires substantial statistical analysis and is not always available. As a result, the AOI tool is useful for capturing variance; however the tool ultimately relies upon extensive human expertise for evaluation.

Failure analysis is described below.

For failure analysis of a defective Imaging array, only one or a few of the defective pixels are typically evaluated by human operators for root cause analysis. This failure analysis includes manually locating the defective pixel, cross reference with in line test or AOI data, and in many cases sending the material out tor additional destructive testing. Moreover this process typically involves teams of engineers to involve in discussions over which failures take precedence and in many cases is a fairly subjective decision making process. In summary, only a handful of pixels are able to be fully evaluated, leading to a substantial amount of error in the FA process.

According to embodiments, a more extensive, automated, and highly parallel statistics based failure analysis method and system comprises in-line AOI data, end of line test data, and highly efficient and accurate neural networks generating exhaustive loss analysis for each imaging array.

As previously described, to fully understand the root-cause failure of an imaging array, it would be ideal to consider every pixel which corresponds to a defective element. However, while end of line test data provides the essential pass/fail criterion, the root cause of a failed pixel is not immediately clear, but requires much deeper analysis.

The in-line and AOI data may be used to compare defects which were detected throughout the manufacturing cycle with the end of line data to find correspondence. However this requires substantial human resources, time, and most importantly expertise and experience.

Moreover, it is common that a product can have several root causes only one of which may be considered in the pass I fail criterion. While this task is neither practical nor efficient for a human to approach, it is an ideal task for a Convolutional Neural Network ("ConvNet").

The ConvNet is described below.

In a simplified form a Neural Network may be comprised of an Input Layer, a Hidden Layer, and an Output Layer as shown in FIG. 1A. The output layer is a function of the inputs and the weights and biases, which effectively determine the response of the Neural Network to Input signals. Therefore, there is great interest in searching for the optimal values for the Hidden Layer so as to provide the correct output signal for a set of input data.

FIG. 1A thus shows the Input X, the hidden layer h, and the output f(x). In the depicted equations $h_i$ represents the output of layer I, prior to activation function sigma and f(x) represents the output of layer h after passing through the activation layer.

For image classification problems, Convolutional Neural Networks ("CNNs") are often used. The convolution of an input image with a network filter (kernel) ensures the 2D spatial correlation of the data is preserved by the neural network, while also providing sparsity to the layer interconnects, and reducing computational requirements. As shown in FIG. 1B, units 102, 104, 106, and 108 in the convolution layer below have receptive fields of width three in the input feature map 114 and are thus only connected to three adjacent neurons in the input layer. Units 102 and 104 are coupled to pooling units no, and units 106 and 108 are coupled to pooling unit 112. Pooling unit 120 is also shown in FIG. 113. Convolution networks are preferred for image classification because they preserve spatial location of objects and they are sparse in nature, which requires less computational memory.

Referring now to FIG. 1B, for an arbitrary image I (114), and filter F (116), the convolution C (118) may be expressed as:

$$C(x, y) = \sum_{a=0}^{K-1} \sum_{b=0}^{N-1} I(x-a, y-b) F(a, b)$$

In practice, a ConvNet with a larger number of hidden layers have been shown to have improved performance over CNNs with less hidden layers. In addition, having multiple kernels at each convolution is also advantageous. An example of a "Deep" CNN 200 having several hidden units is shown in FIG. 2. CNN 200 includes an RGB input image 202, learned filters 204, 206, and 208, dense nodes 210, and five output predictions 212.

Figure 3:
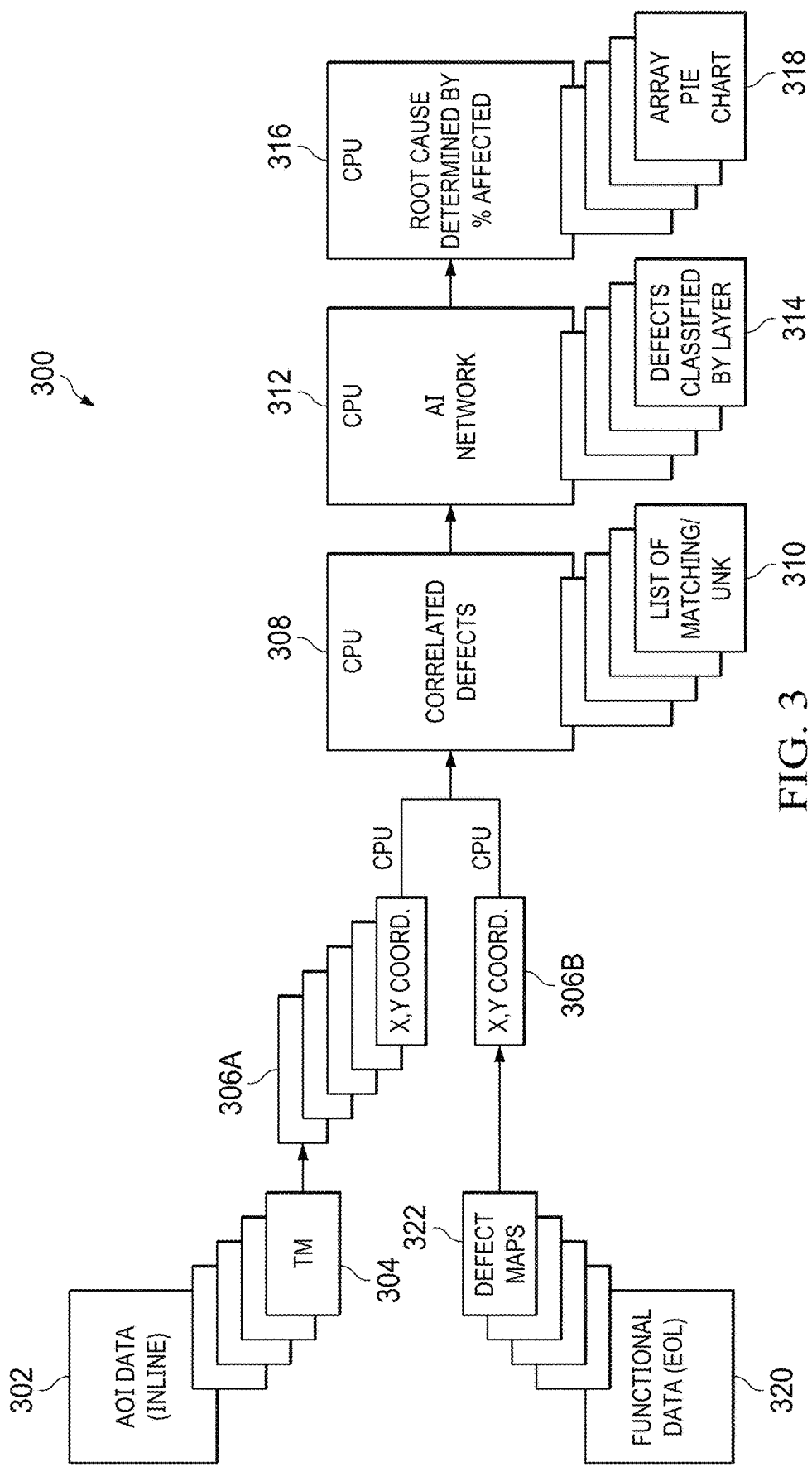
FIG. 3 is a root cause classification system according to an embodiment.

According to embodiments, the method includes a framework which comprises several elements used in conjunction to determine a statistics based root cause analysis for failing imaging arrays, while also providing the capacity for a statistics driven quality improvement. An embodiment of the method and system shown in FIG. 3 comprises (1) a database 302 of in line AOI data for a given imaging array, (2) End of line functional test data 320 for a given imaging array, (3) an intersection of AOI defect coordinates 306A and Functional Data Defect Map coordinates 306B, (4) a ConvNet 312 capable of classifying correlated AOI image data 308, and (5) a statistical breakdown 316 of root cause failures for each defective pixel. Shown in FIG. 3 is a diagram of this flow of information which includes each optical inspection layer of the manufacturing process 304, which includes the AOI data 302, and defect maps 322, which includes the functional data 320. A list of matching defect IDs and Names 310 is used with the correlated defects 308. The ConvNet 312 produces a set of defects 314 classified by each layer therefore to attribute a root cause. The root causes 316 can be arranged in a pie chart 318 to show the percentage of each determined root cause. Each of 306A, 306B, 308, 310, 312, 314, 316, and 318 can be implemented or generated in conjunction with a "CPU", which is defined as one or more central processing units, a computer system, or other processor or set of processor, which may include a computing system, which in turn may include those components that would be known by those skilled in the art such as memory, input devices, displays, software, and other hardware, software, and firmware components. The computer system could also include, or be associated with, testers, other hardware components, an array interface, readout electronics, and post processing algorithms.

The framework of an embodiment method exploits the recurrence of regular known defects in the manufacturing cycle. According to embodiments, once the AOI and Functional Imaging data have been collected for an array, the algorithm for generating statistical root cause analysis is automatic. Root cause failure analysis for all pixels exhibiting failures can be done in an automated and highly parallel fashion. Furthermore, pixels which are not yet failures, but which are near the specification limits may also be assessed. As a consequence, the algorithm provides the basis for statistic driven quality improvement.

Training data is now described.

Figure 4:
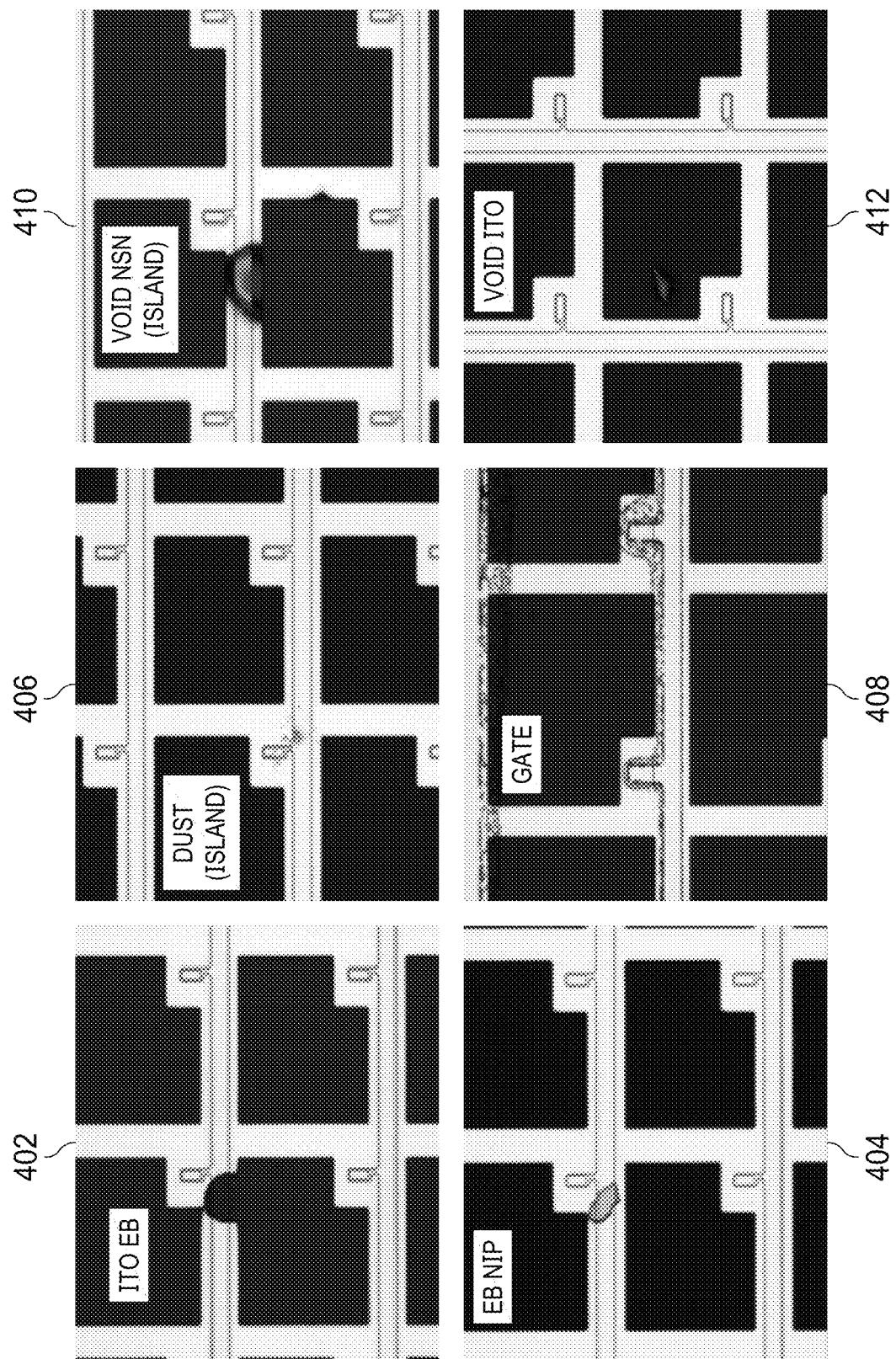
FIG. 4 shows defect classifications at an ITO step according to an embodiment.
Figure 5:
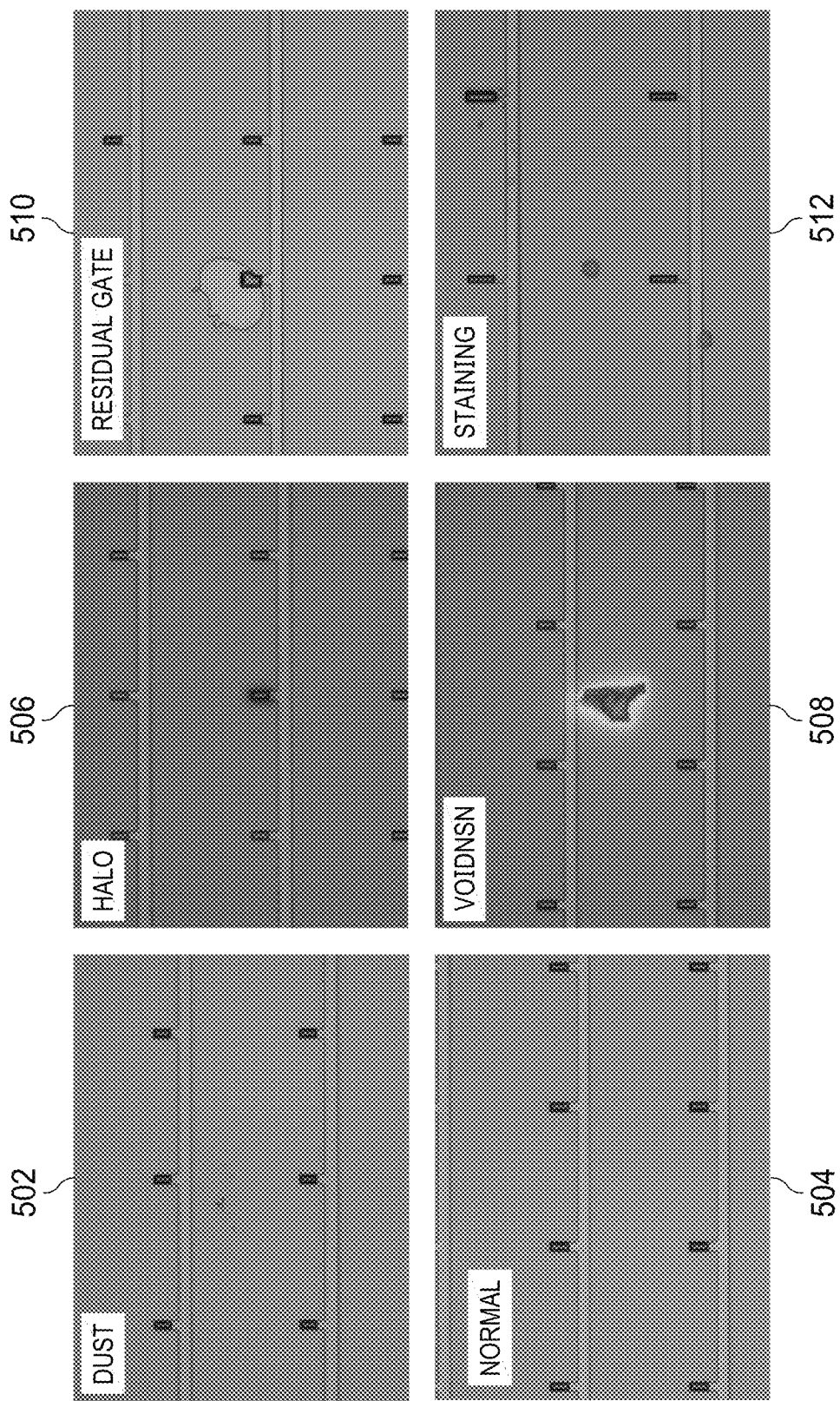
FIG. 5 shows defect classifications at an island step according to an embodiment.

One of the advantages of using a ConvNet according to an embodiment is related to the uniformity of the active area of the image sensor array, and the relatively small number of defects classes (each of which has a known root cause). As can be seen in the subsequent plan view image sensor array images of FIGS. 4 and 6-8, nearly all images have very similar if not identical features. What this implies from a machine learning perspective is that the ConvNet is able to learn all of the important features from a relatively small training dataset. FIG. 4 shows an example of six classifications that can be used for the Indium Tin Oxide ("ITO") step of the image sensor array defect classification. Using only these six classes, the two largest root causes of image array failures (lines and clusters) can be efficiently detected. The six classes are ITO etch blocks ("ITO_EB") 402, NIP diode Etch Blocks ("NIP_EB") 404, dust 406, gate line residue 408, and film voids in the gate dielectric ("VOID_NSN") 410, and Void ITO 412. Similarly, FIG. 5 shows an example of six classifications that can be used at the Island step of the image sensor array defect classification. The six classes are Dust 502, Normal 504, TFT residue 506, voids in the gate dielectric ("VoidNSN") 508, gate line residue 510, and staining 512.

Other manufacturing steps and defect types can of course be used and FIGS. 4 and 5 are only examples of such manufacturing steps and defect types that are amenable to the system and method, according to embodiments.

Figure 6:
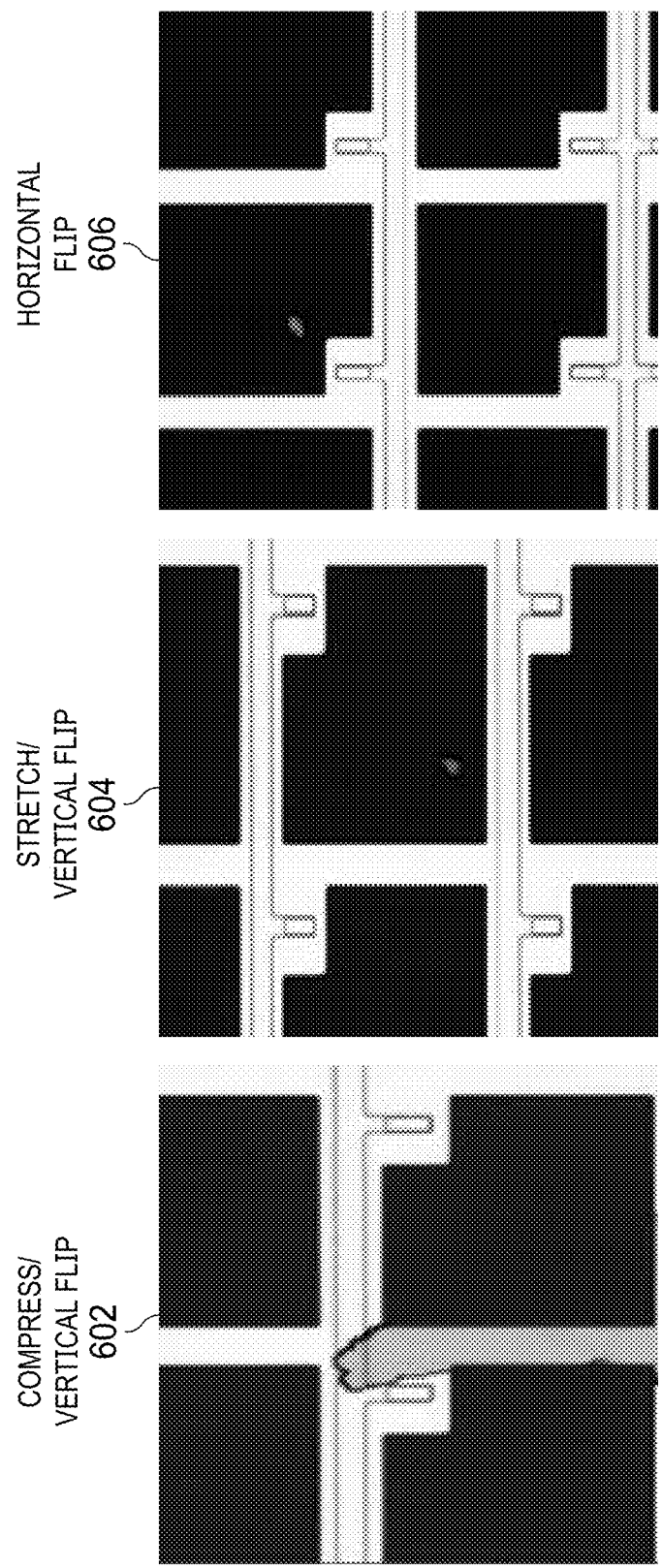
FIG. 6 shows preprocessing of defect images according to an embodiment.

One of the challenges in designing an automated defect classification system relates to product differentiation. For example, some products have different size pixels, different size Thin Film Transistors ("TFTs"), or a combination of the two. However, using ConvNets, according to embodiments, flexibility is achieved by training the network on pre-modified AOI data. Image processing of the training data allows the network to remain invariant to the changes in the size and shape of the photodiode/TFT for various products. FIG. 6 shows example image processing operations such as rotation 606, compression 602, and stretching 604 that are applied to the training datasets to improve the robustness of the neural network. Other operations can include channel offset, normalization, zooming, or region cropping (not shown in FIG. 6).

Targeted product improvement is described below.

For product improvement, customized defects maps may also be generated for specific benchmarks related with imaging array performance. Such benchmarks may include diode/TFT leakage, photodiode sensitivity, data/gate line opens, noise, or clusters of various sizes and features, for example. Automatic classification of these defective pixels, and correlation with a particular set of processes in the manufacturing cycle is valuable information to make improvements manufacturing cycle.

Figure 7:
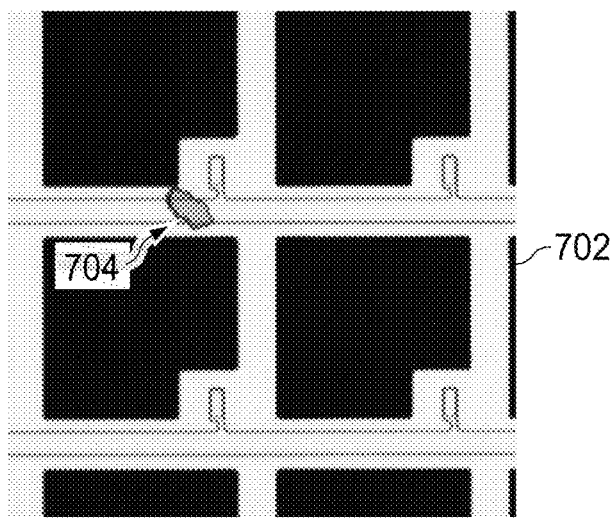
FIG. 7 shows a sensor defect detected by the neural network and corrected to a cluster defect, according to an embodiment.

A first example of a Cluster Defect 704 associated with chamber flaking on array portion 702 is shown in FIG. 7. FIG. 7 thus shows a sensor defect detected by the ConvNet and correlated to Cluster.

Figure 8:
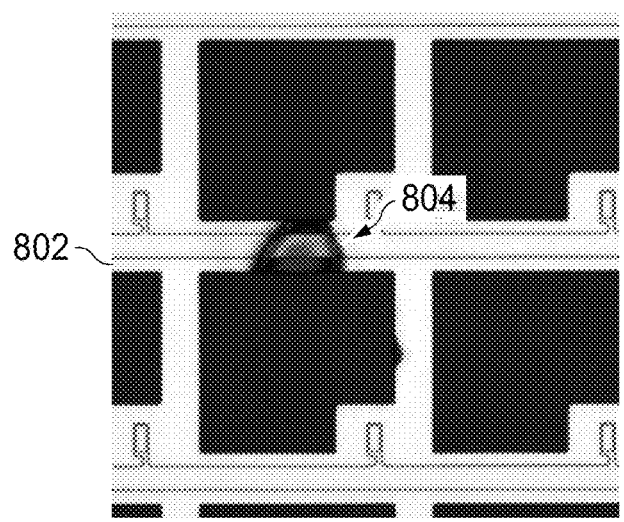
FIGS. 8 and 9 show a gate defects detected by the neural network and correlated to a gate open defect, according to an embodiment.

A second example of a Void Defect 804 associated with the previous manufacturing step of FIG. 7 is shown in array portion 802 of FIG. 8. FIG. 8 thus shows a sensor defect detected by the ConvNet, and correlated to Gate Open.

Figure 9:
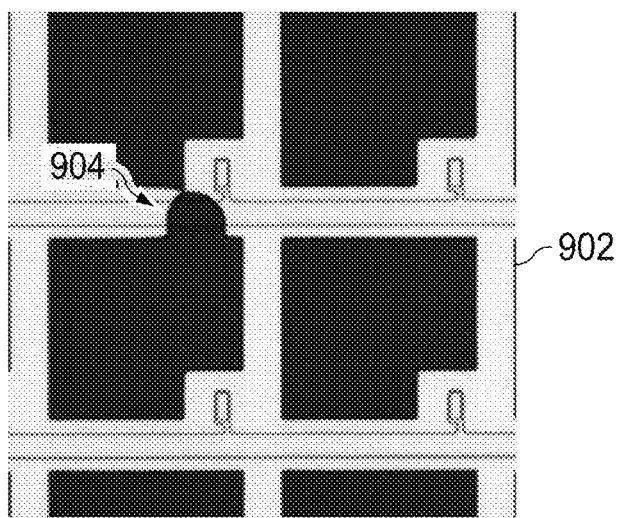

A third example shown in FIG. 9 is a defect 904 associated with particles and a wet etch process in array portion 902. FIG. 9 thus shows a gate defect 904 detected by the ConvNet, and correlated to Gate Open.

Figure 10:
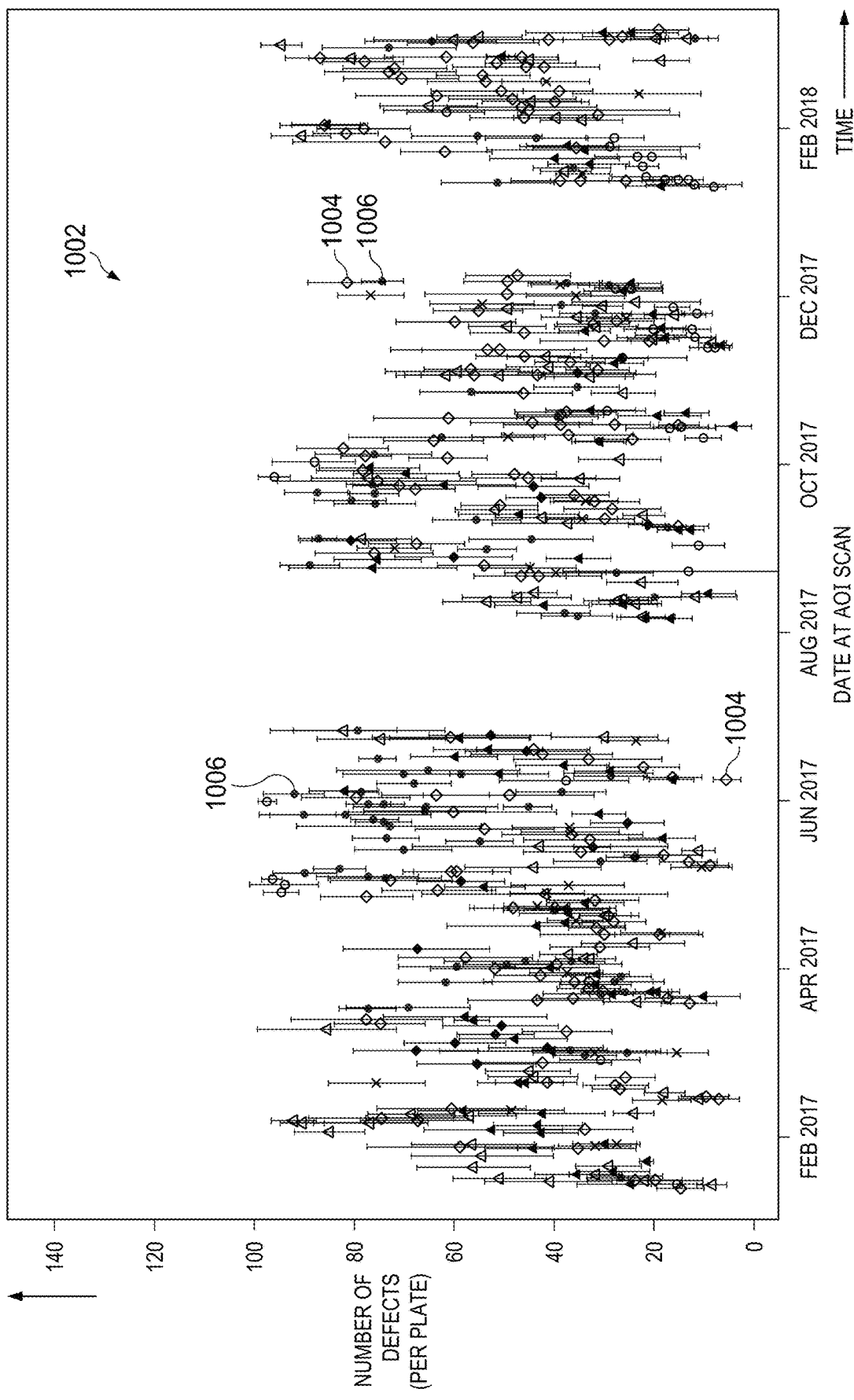
FIG. 10 shows the number of a particular type of defect in the manufacture of two different products with respect to time.

A fourth example shown in FIG. 10 is an aggregated time series plot 1002 of the occurrence rate for a particular void defect ("ITO VOID") showing clear correspondence to the physical vapor deposition (PVD) tool's target changes. Over the lifetime of an ITO sputtering target, there is an accumulation of residual dust and particulate ITO material which is a byproduct of the sputtering process. These small particles and dust can reach the substrate and act as a physical blocking layer during ITO deposition. As a result, they leave behind an image signature which is registered by the AOI as a defect. When each ITO target is changed, the new "clean" target leaves behind substantially lower number of these defects than a target at the end of its life. The aggregated time series plot 1002 shows the occurrence rate for a particular cluster defect for a particular product type (1004 and 1006) showing a difference in occurrence rates at different times.

Figure 11:
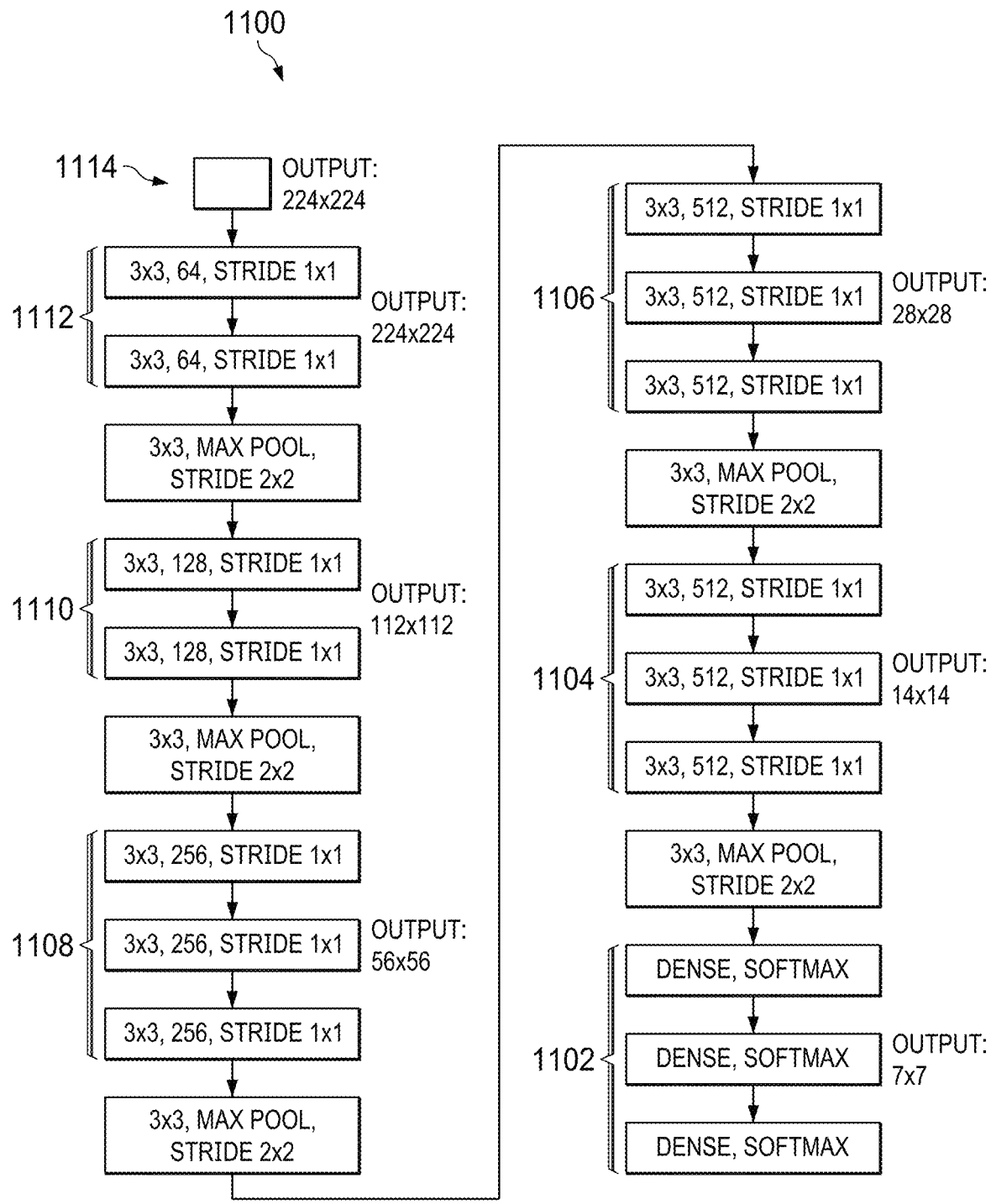
FIGS. 11, 12A, and 12B show further details of the organization of a neural network according to an embodiment.

FIG. 11 shows a fourth example of a Visual Geometry Group ("VGG") Convolutional Network 1100 that may be implemented for the ConvNet, according to embodiments. Block 1102 is an output block, blocks 1104, 1106, 1108, 1110, and 1112 are intermediate blocks, and block 1114 is an input block. FIG. 11 shows the input of the VGG network 1114 having dimensionality 224×224 for example, and each of the subsequent convolution, max pooling and dense layers, previously referred to as "blocks".

Figure 12A:
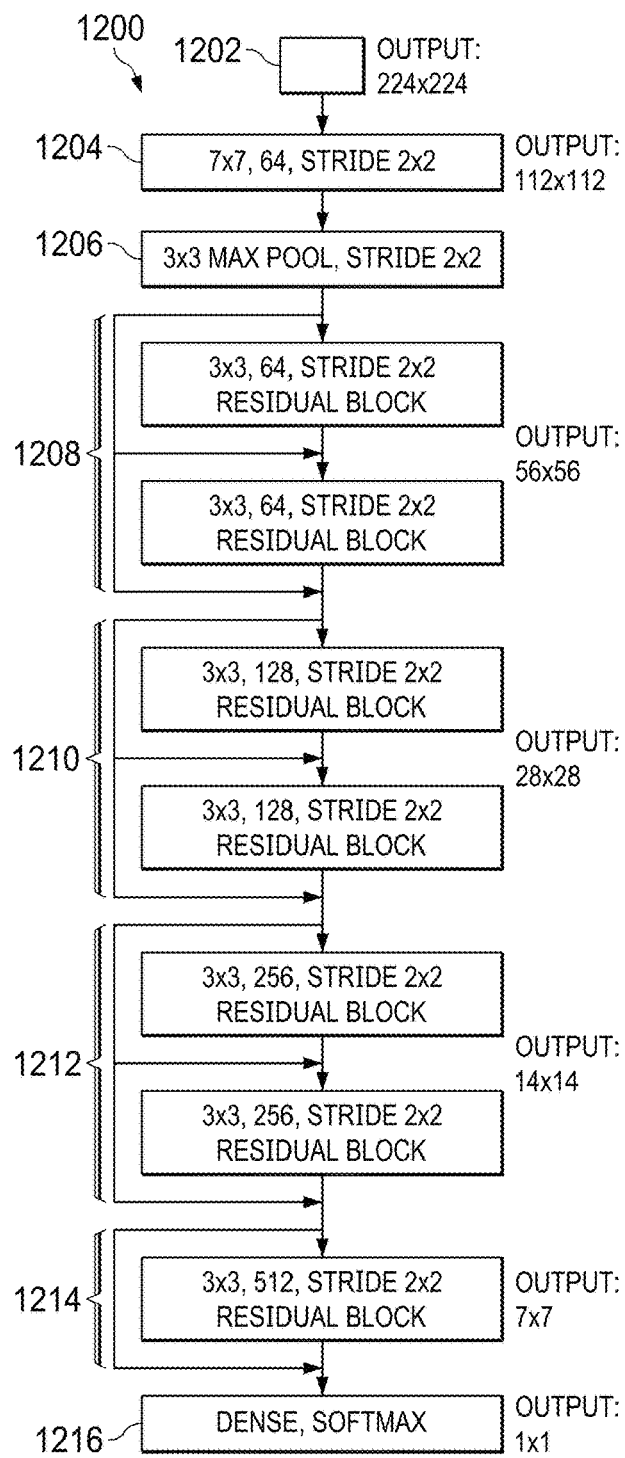
Figure 12B:
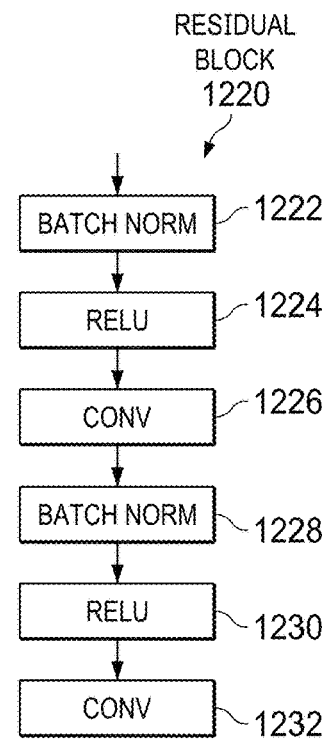

FIGS. 12A and 12B show a fifth example of a Residual Network ("ResNET") Convolutional Network ("ConvNet") that may be implemented for the ConvNet, according to embodiments. FIG. 12A shows ConvNet portion 1200, including blocks/layers 1202 (input), 1204, 1206, 1208, 1210, 1212, 1214, and 1216 (output). FIG. 12B shows ConvNet portion 1220 (residual block), including blocks 1222, 1224, 1226, 1228, 1230, and 1232. These components of the Residual Block are used for normalization and reducing the number of training parameters of the network while increasing the networks depth and expressive capability. For example, batch normalization normalizes the output of previous layers so as to avoid prematurely saturating layers during training. As a result, this block also allows each of the layers to learn somewhat independently from each other. RELU activation layers are also advantageous as they mitigate vanishing/exploding gradients, for example, and therefore reduce the amount of time required to train a network to reach a desired performance level.

Figure 13:
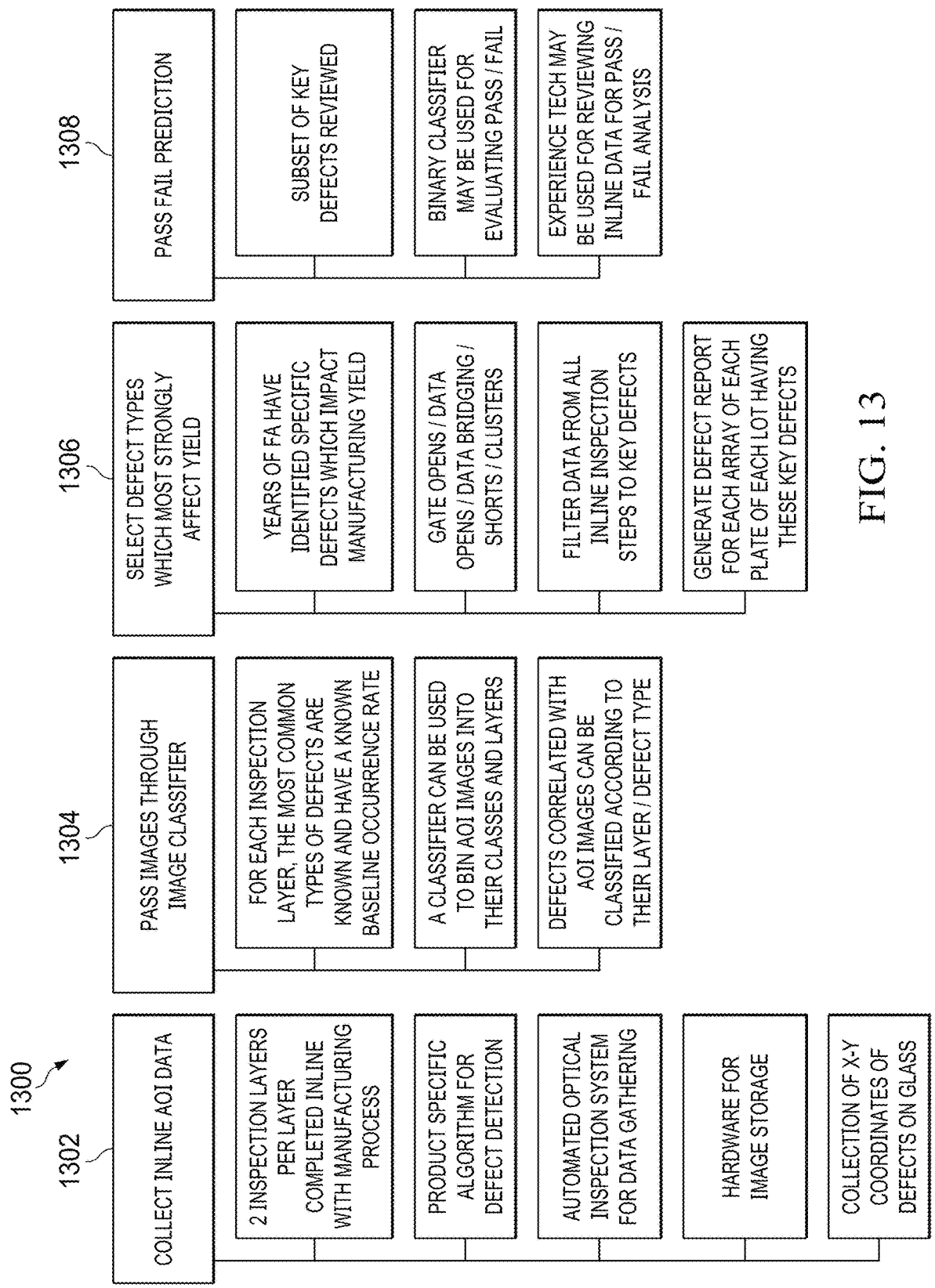
FIG. 13 is a flow chart of an in-line prediction method according to an embodiment.

FIG. 13 is a flow chart of an in-line prediction method, according to embodiments. Embodiment method 1300 includes the steps of collecting in-line AOI data 1302, passing the images through an image classifier 1304, selecting defect types that most strongly affect yield, and pass/fail prediction 1308. Each of these steps is described in further detail with respect to FIGS. 14 through 24.

Figure 14:
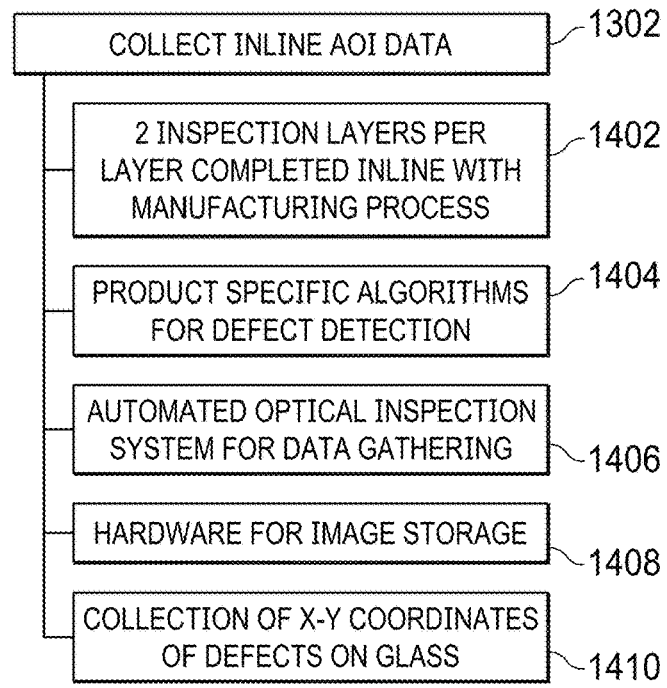
FIG. 14 is a block diagram illustrating further detail of an in-line AOI data collection step associated with the flow chart of FIG. 13.

FIG. 14 shows a block diagram of further details of the AOI data collection step 1302, including: two inspection steps for each layer of material deposited in the manufacturing cycle (Develop Inspect and post-etch Final Inspect) completed in-line with the manufacturing process 1402, product specific algorithms are used for each defect detection 1404, an automated optical inspection system is used for data gathering 1406, hardware is required for image storage 1408, and collection of (x-y) coordinates of the defects on glass is performed 1410.

The AOI data collection step 1302 includes in-line optical inspection of product at various stages of the manufacturing cycle. Glass including the sensor array is loaded into inspection tool. Alignment marks locate the glass within the tool and an Autofocus algorithm aligns the optical field. Custom scanning algorithms based on primitive unit cells for each product are used for scanning product. Deviations from unit cell are flagged as potential defects i.e. particles, flakes, voids, etc. Each layer has a Develop Inspect ("DI") and Final Inspect ("FI") step, which inspects lithography and final etching step for each layer respectively. These inspection steps generate thousands of images across twenty or more individual plates for a specific manufacturing process, some of which do not affect product performance, and some of which do. The (x,y) coordinates for each defect image for each array is recorded in terms of its corresponding data/gate line. The data is stored for example on a secure server, a network drive, or a flash drive. Each array on each glass for each lot is measured at each of the DI/FI steps for each of the thin film layers that comprise the final product.

Figure 15:
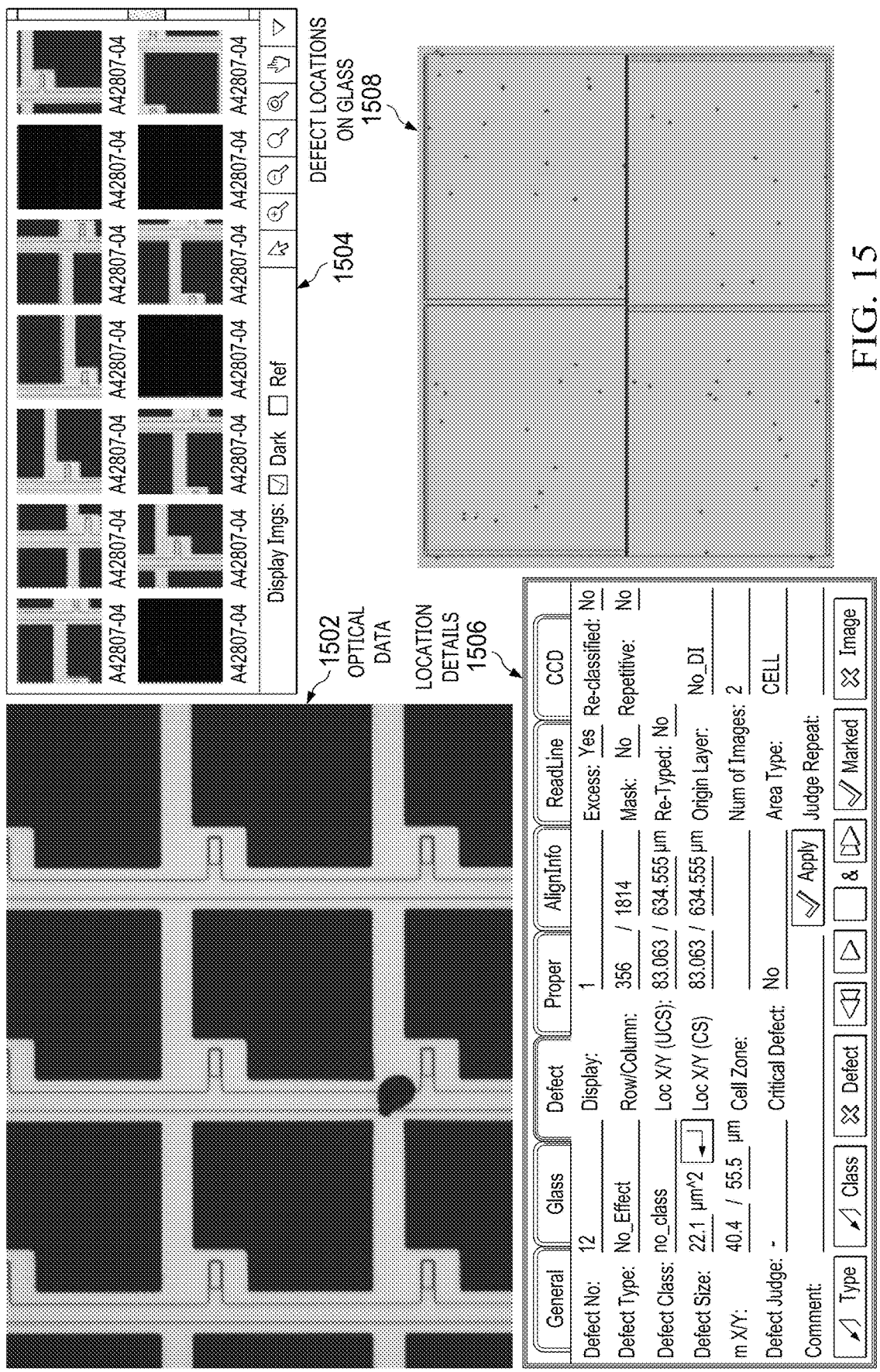
FIG. 15 shows optical inspection data images and data associated with FIG. 14.

FIG. 15 shows an array portion 1502 with a defect, a menu 1504 for selecting a manufacturing layer, menu 1506 illustrates location details associated with the defect, and image 1508 shows the defect locations on the glass, all associated with the AOI data collection step 1302.

Figure 16:
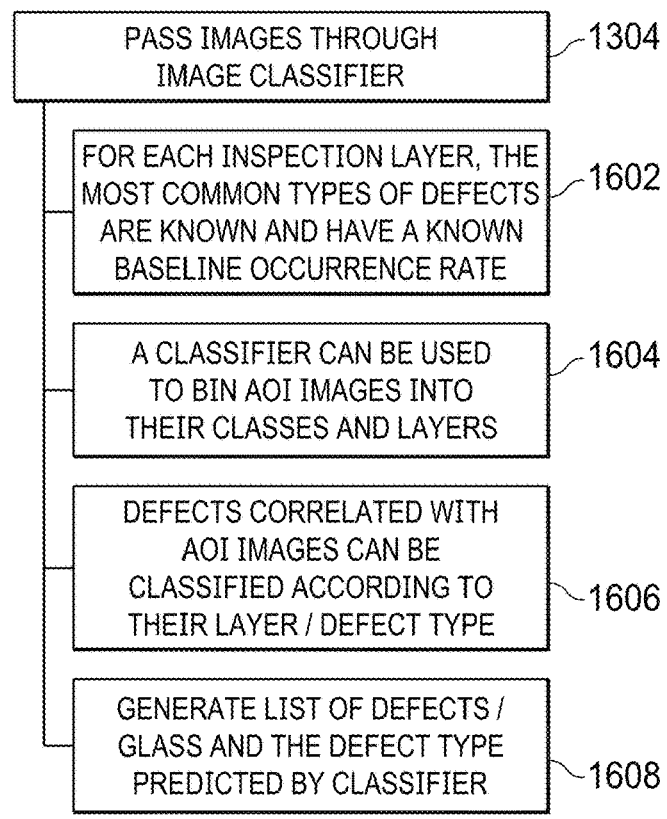
FIG. 16 shows a block diagram illustrating further detail of an image classifier step associated with the flow chart of FIG. 13.

FIG. 16 shows a block diagram of further details of the image classifier step 1304, including: for each inspection layer, the most common types of defects are known and have a known baseline occurrence rate 1602, a classifier can be used to bin AOI images into their respective classes and layers 1604, defects correlated with AOI images can be classified according to their layer/defect type 1606, and a list of defects per array and the defect type predicted by the classifier are generated 1608.

In embodiments, AOI data analysis is able to classify >90% of the defects at each in-line AOI inspection module. These are recurring defects of known origin with known baseline occurrence rates. For each inspection module, a fixed number of classification bins have been pre-defined based upon a knowledgebase built up from previous inspections. Additional classifications can be added at any time. A classifier/model can be built to automatically assert defect layer, defect type, and defect size for each of these in-line defects. Network models that may be used include but are not limited to convolution neural networks, but may also include custom input layer dimensions depending on image size and a custom number of defect classes for each inspection module. These models are trained/evaluated on a Central Processing Unit ("CPU") with a Graphics Processing Unit ("GPU") for acceleration. The training/validation datasets are generated internally using engineering experience and knowledge generated from previous inspections. The models are customized in terms of the network depth and number of trainable parameters as desired for a specific application. Each inspection layer can have its own model, or all inspection layers can be evaluated using a single model. One model per inspection layer is used in an embodiment to achieve the highest accuracy. A list of defect type predictions/inspection layer is generated for each array on each plate, for each lot.

Figure 17:
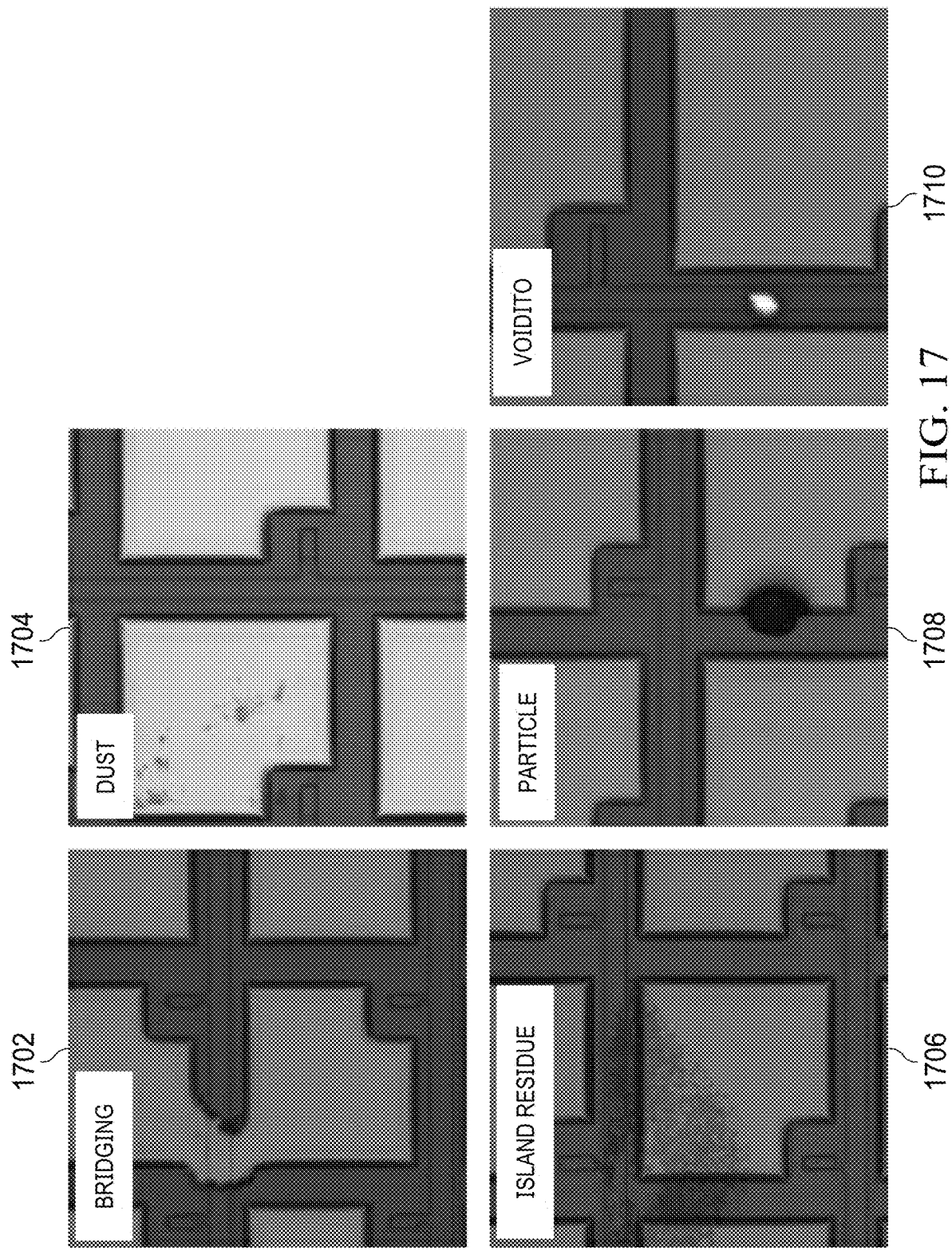
Figure 18:
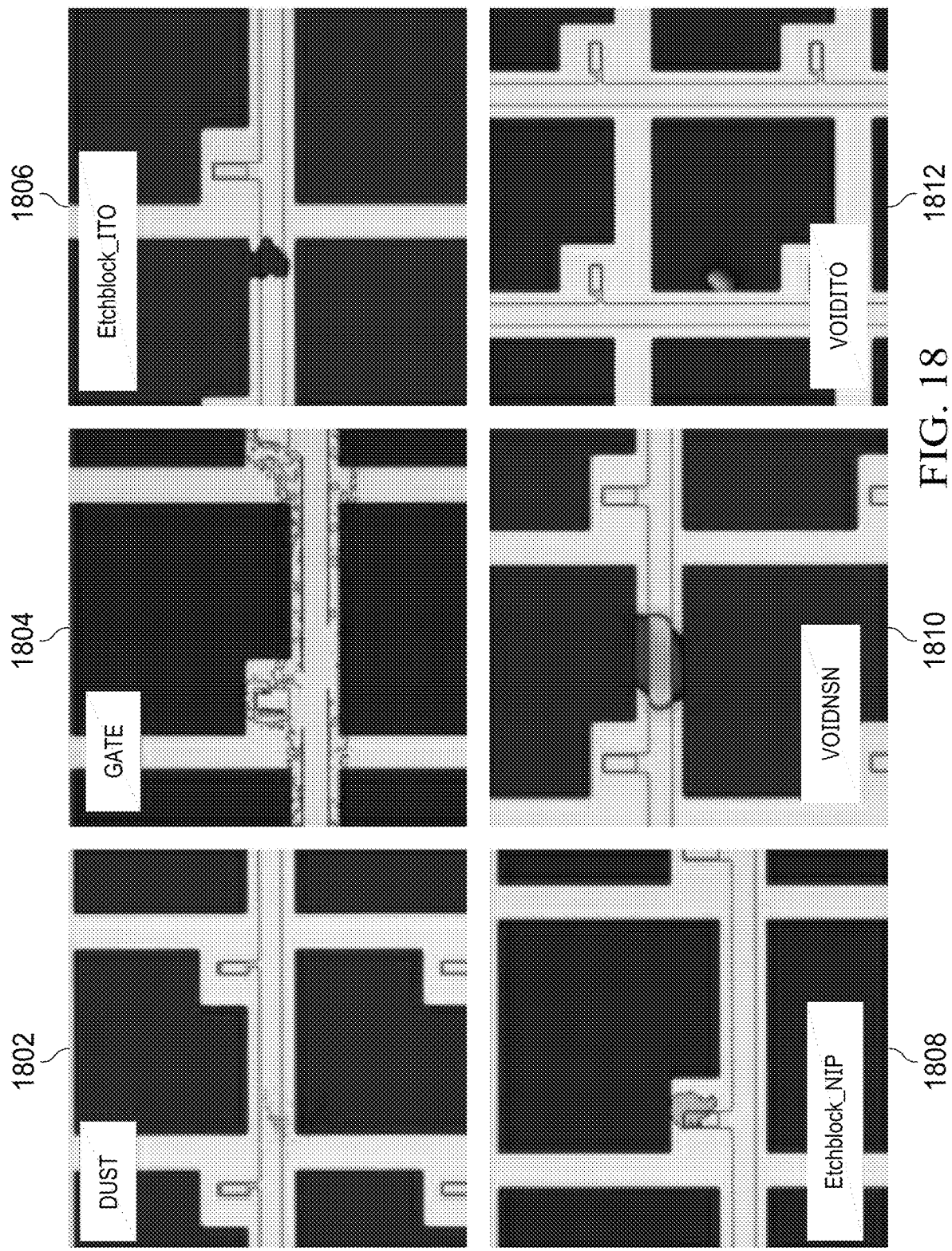
Figure 19:
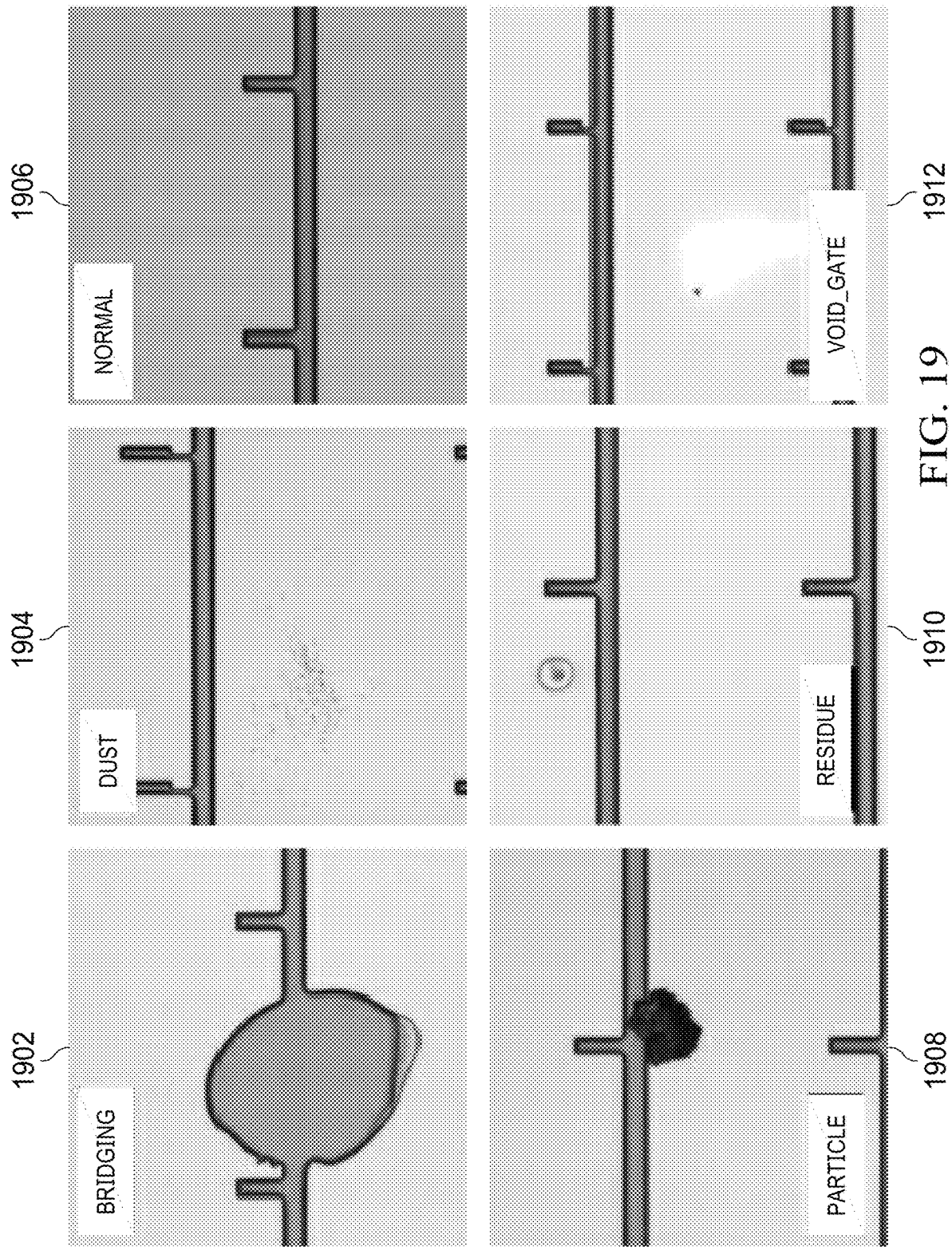
Figure 21:
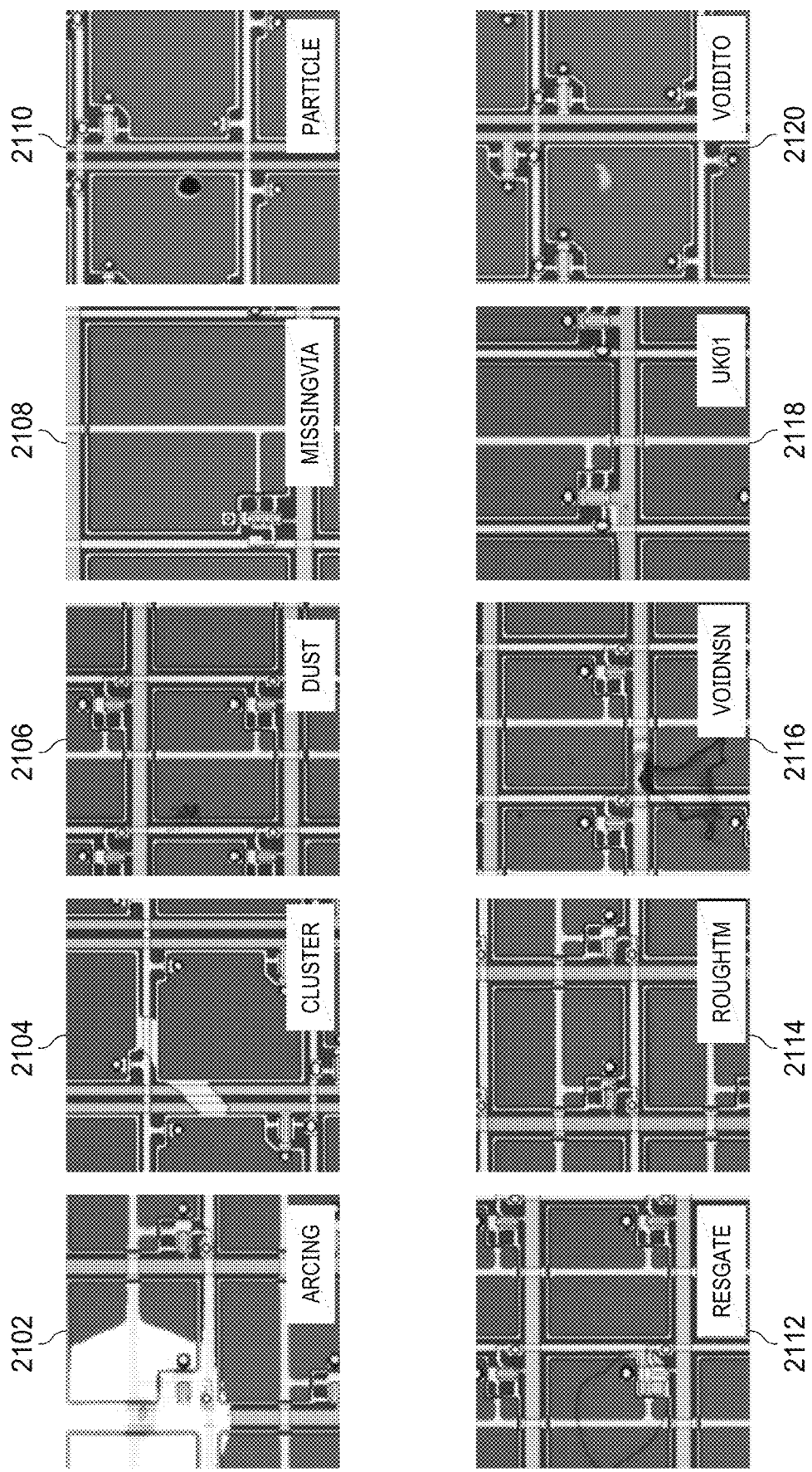

FIGS. 17 and 18 show DI and FI module classification bins at various layers comprising the manufacturing process. FIG. 17 shows bridging 1702, dust 1704, island residue 1706, particle 1708, and VOIDITO 1710 classification bins for the Island DI step. FIG. 18 shows dust 1802, gate 1804, Etchblock_ITO 1806, Etchblock_NIP 1808, VOIDNSN 1810, and VOIDITO 1812 classification bins for the ITO FI step. FIG. 19 shows Gate DI module classification bins including bridging 1902, dust 1904, normal 1906, particle 1908, residue 1910, and VOID_GATE 1912 for the Gate DI step. FIG. 20 shows Island DI module classification bins including dust 2002, TFT residue 2004, gate line residue 2006, normal 2008, particle 2010, stain 2012, and VOIDNSN 2014. FIG. 21 shows Top Metal FI module classification bins including arcing 2102, cluster 2104, dust 2106, missing via 2108, particle 2110, resgate 2112, rough data lines 2114, VOIDNSN 2116, source drain residue, and VOIDITO 2120.

Figure 22:
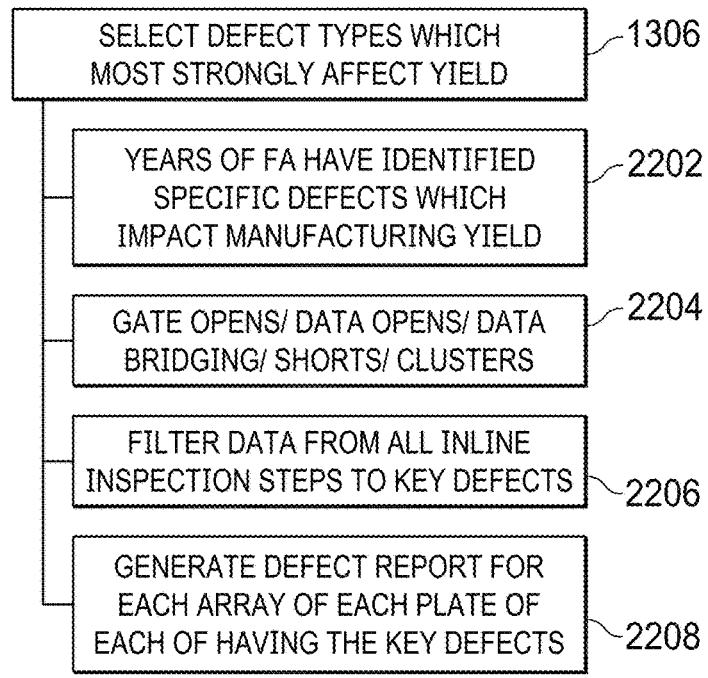
FIG. 22 is a block diagram illustrating further details of a key defect type step associated with the flow chart of FIG. 13.

FIG. 22 shows a block diagram of further details of the key defect type step 1306, including: identifying specific defects that impact manufacturing yield based on previous failure analysis 2202, specific defects can include gate opens, data opens, data bridging, shorts, and clusters 2204, filter data from all in-line inspections steps to only show key defects 2206, and generate a defect report for each array of each plate of each lot having the key defects 2208.

Based on the previously known yield Failure Analysis, the defects leading to product failure are known to within greater than 90%. Furthermore, the defect types associated with each inspection layer are also known. Thus, a subset of key defect types can therefore be generated for known defects which cause failure and known inspection layers. As previously described, key defects include gate opens, data shorts, and clusters. By using this subset of defects, only a small subset of images need be reviewed during final root cause failure analysis. Arrays for which these defects are occurring may also be flagged as potentially failing in-line and may be scrapped pro-actively so as to minimize allocation of additional resources for failing product.

Figure 23:
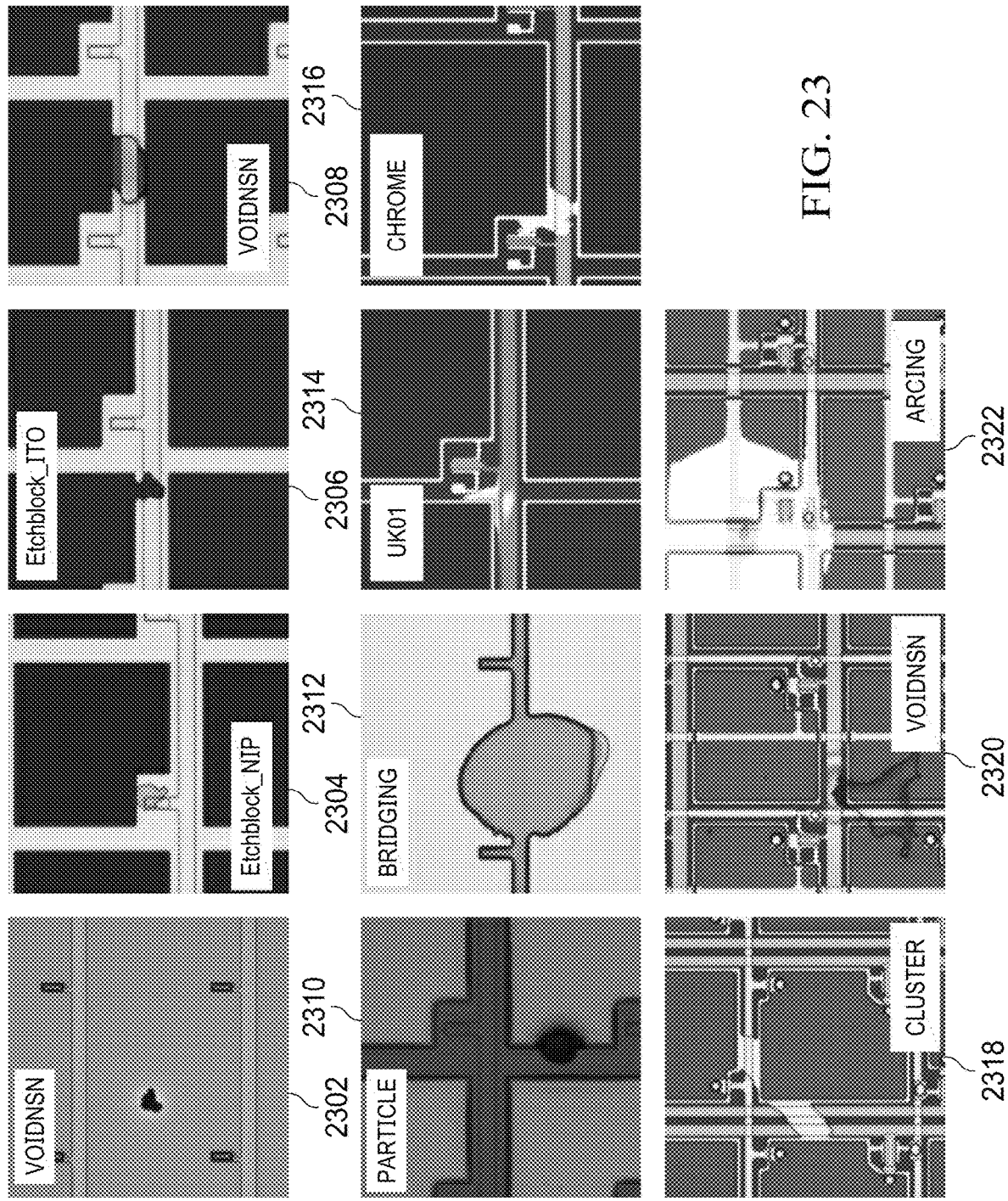
FIG. 23 shows optical inspection data images associated with FIG. 22.

FIG. 23 shows an assortment of the most critical defects, according to an embodiment, including VOIDNSN 2302, Etchblock_NIP 2304, Etchblock_ITO 2306, VOIDNSN 2308, particle 2310, bridging 2312, UK01, 2314, chrome etch block 2316, cluster 2318, VOIDNSN 2320, and arcing 2322 for various layers.

Figure 24:
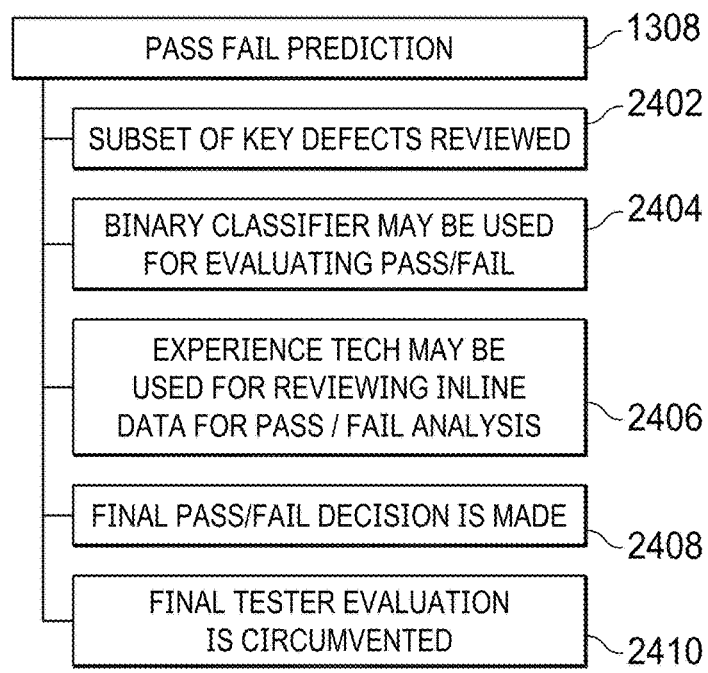
FIG. 24 is a block diagram illustrating further details of a pass/fail prediction step associated with the flow chart of FIG. 13.

FIG. 24 shows a block diagram of further details of the pass/fail step 1308, including: reviewing a subset of key defects 2402, using a binary classifier for evaluating the pass/fail criterion 2404, optionally using an experienced technician for reviewing the in-line data for pass/fail analysis 2406, making the final pass/fail decision, and circumventing final tester evaluation 2410. Without the use of an in-line predictive model, it is common that arrays would continue through processing and undergo final array testing and evaluation which would consume test time and test resources.

Arrays flagged in previous step are reviewed. As previously described, the review can be done by a trained technician or an automated model. The model can be trained neural network, a Long Short-Term Memory ("LSTM") network, Decision Tree, or other model. The model can also take into account parameters such as defect type, defect size, defect location on the unit cell. Based on reviewing a small subset of a very large number of in-line optical image data, a pass/fail prediction can be made based on the analysis of key defect types, according to embodiments.

Figure 25:
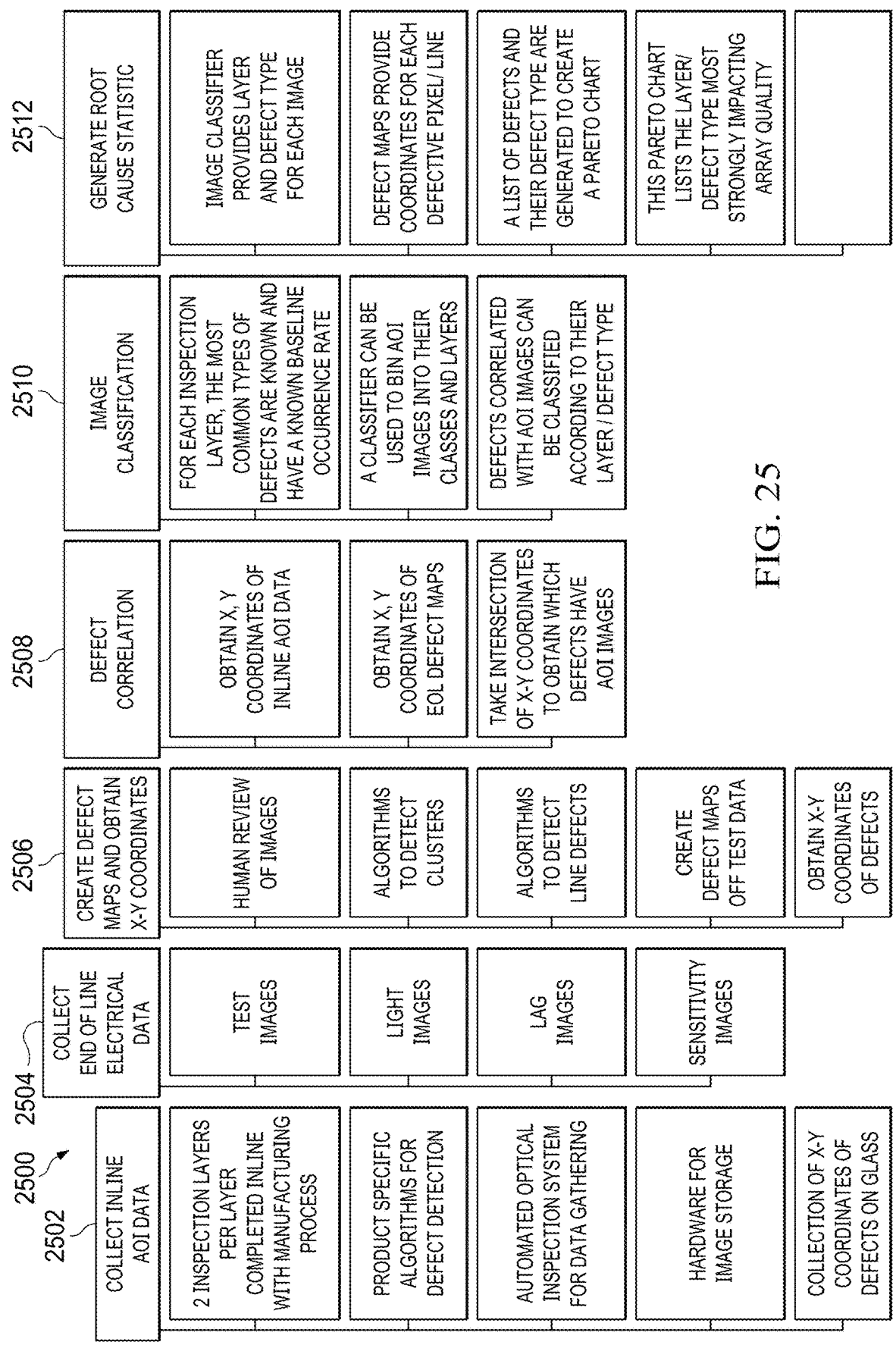
FIG. 25 is a flow chart of a quality improvement method for an image sensor product according to an embodiment.

FIG. 25 is a flow chart of a quality improvement method, according to embodiments. Embodiment method 2500 includes the steps of collecting in-line AOI data 2502, collecting end of line electrical data 2504, creating defect maps and obtaining (x-y) coordinates, defect correlation 2508, image classification 2510, and generating root cause statistics 2512. Each of these steps is described in further detail with respect to FIGS. 26 through 40.

Figure 26:
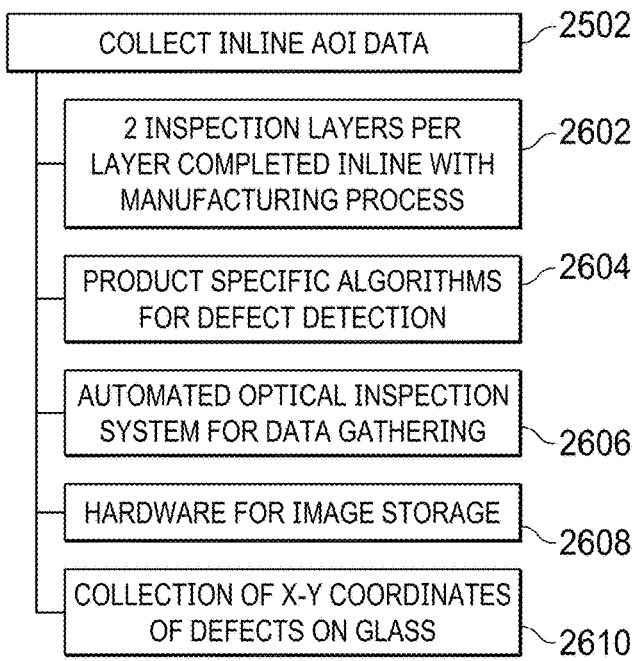
FIG. 26 is a block diagram of an in-line AOI data collection step associated with the flow chart of FIG. 25.

FIG. 26 shows a block diagram of further details of the AOI data collection step 2502, including: a develop inspection ("DI") and a post etch final inspection ("FI") completed in-line with manufacturing process 2602, product specific algorithms are used for each defect detection 2604, an automated optical inspection system is used for data gathering 2606, hardware is required for image storage 2608, and collection of (x-y) coordinates of the defects on glass is performed 2610.

The AOI data collection step 2502 includes in-line optical inspection of the manufactured product. Glass including the sensor array is loaded into inspection tool. Alignment marks locate the glass within the tool and an Autofocus algorithm aligns the optical field. Custom scanning algorithms based on primitive unit cells for each product are used for scanning product. Deviations from unit cell are flagged as potential defects i.e. particles, flakes, voids, etc. Each layer has a Develop Inspect ("DI") and Final Inspect ("FI") step, which inspects lithography and final etching step for each layer respectively. These inspection steps generate thousands of images across twenty or more individual plates for a specific manufacturing process, some of which do not affect product performance, and some of which do. The (x,y) coordinates for each defect image for each array is recorded in terms of its corresponding data/gate line. The data is stored on a File Transfer Protocol ("FTP") server. Each array on each glass for each lot is measured at each of the DI/FI steps for each of the thin film layers that comprise the product. Mask layers can also be referred to as "modules" herein.

Figure 27:
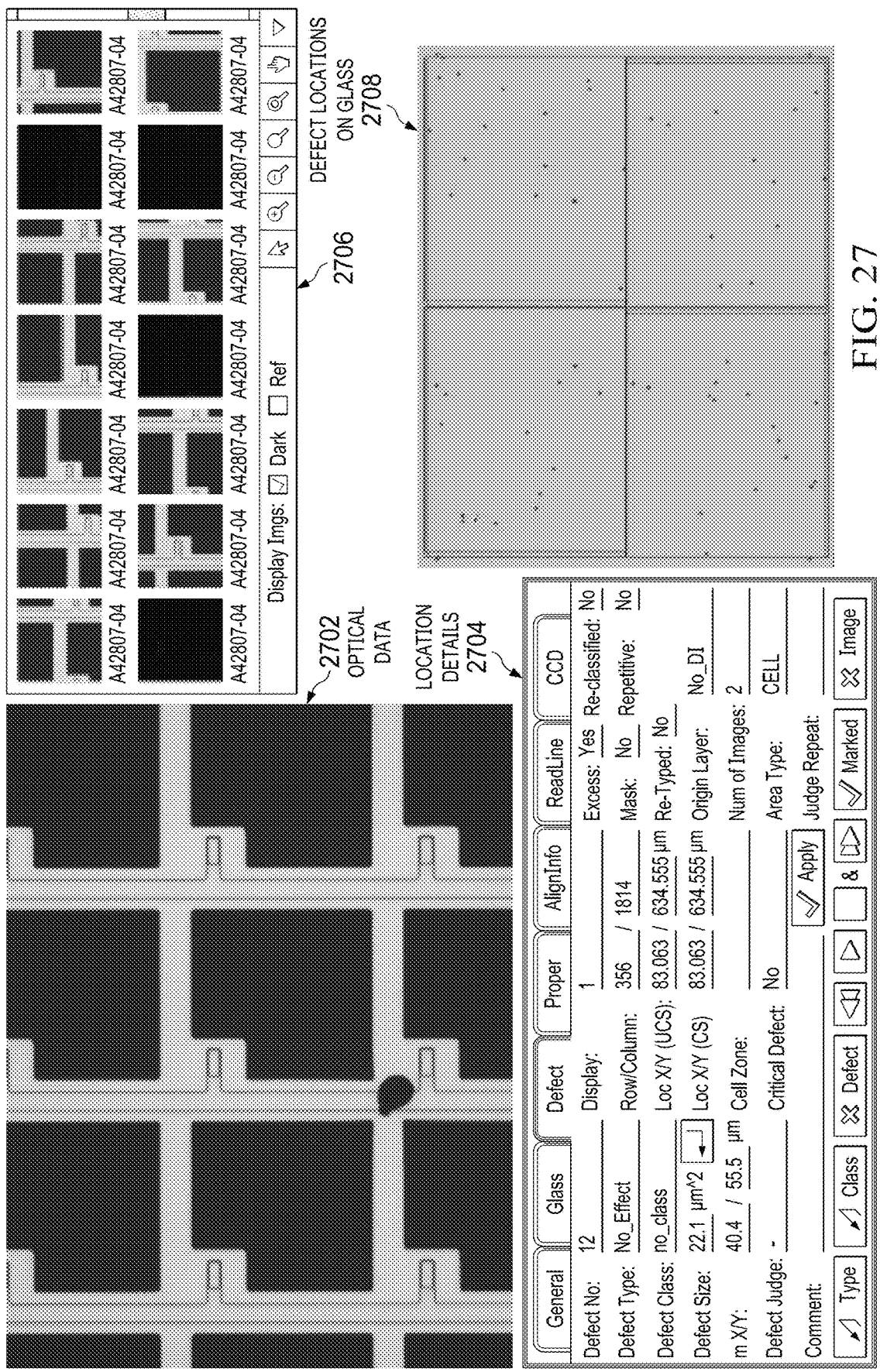
FIG. 27 shows optical inspection data images and other data associated with FIG. 26.

FIG. 27 shows an array portion 2702 with a defect, a menu 2706 for selecting a manufacturing layer, menu 2704 illustrates location details associated with the defect, and image 2708 shows the defect locations on the glass, all associated with the AOI data collection step 2502.

Figure 28:
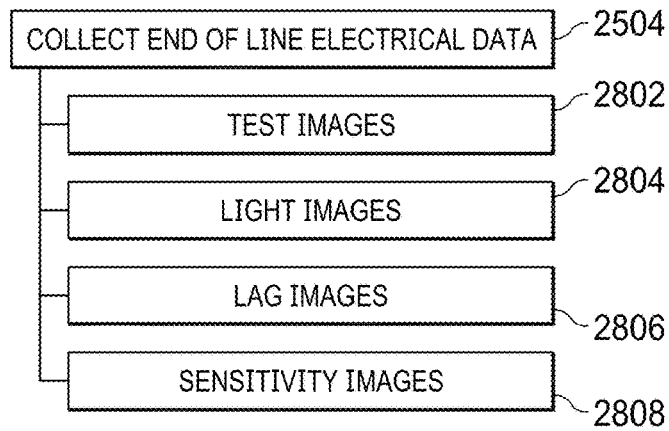
FIG. 28 is a block diagram of an EOL data collection step associated with the flow chart of FIG. 25.

FIG. 28 shows a block diagram of further details of the end of line ("EOL") data collection step 2502, including: obtaining test images 2802, obtaining light images 2804, obtaining lag images 2806, and obtaining sensitivity images 2808. Test images 2802 are functional images generated by the manufactured product in response to electrical stimulus which cycles through each of the gate lines of the array, and simultaneously reads the data lines to read and store the signal generated by each pixel. Light images 2804 are test images which are generated in response to fixed light source to measure the pixels response to the light source. Dark images measure the pixels signal when no light source is present. Lag images 2806 are test images which measure the response time and decay during an on/off transition of a light source. Sensitivity images 2808 are test images which take the difference between the light and dark test images to approximate the baseline sensitivity of the array given a fixed light source. Other test modes can be used to generate additional images, such as Diode Leakage images, high gain images, as well as other images, in embodiments. Different product types and image sensor arrays may need to implement additional or different tests. However for all tests, it may be possible to correlate the defective pixels with AOI data gathered in-line at each inspection step.

End of line ("EOL") electrical tests are used to evaluate product at end of manufacturing line. The electrical tests are performed on custom test equipment designed to accommodate a specific product and corresponding specifications. Standard test equipment can also be used for some products. In an embodiment, image sensor arrays comprising a plurality of pixel locations manufactured on a glass substrate are tested and evaluated. Standard imaging tests evaluate photodiode sensitivity, TFT leakage, Gain, Sensitivity, and other performance characteristics of an image sensor array. The glass is loaded onto and aligned to a test head station. The test station has probes which are aligned to the product, and which descend onto the glass to make electrical contact with readout system. The probes are used for evaluating array imaging capability by simulation real tests using sequences of electrical signals.

Figure 29:
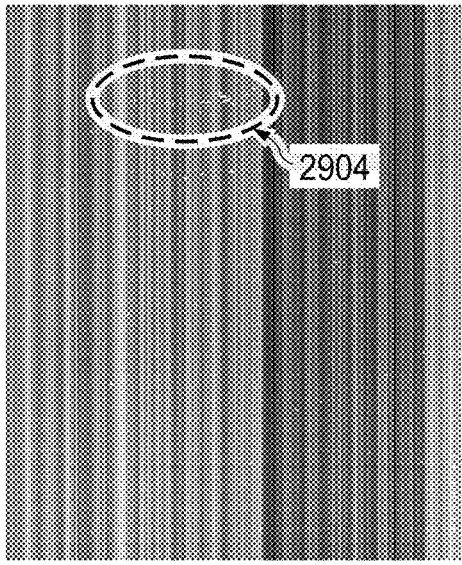
FIG. 29 is an EOL data image associated with FIG. 25.

FIG. 29 shows an example of one of the test images. Image 2902 is an image of the pixel locations exhibiting leakage current above the maximum amount of leakage current allowed for an acceptable pixel. An area of excessive leakage current is shown in the white in the pixels of array location 2904.

Figure 30:
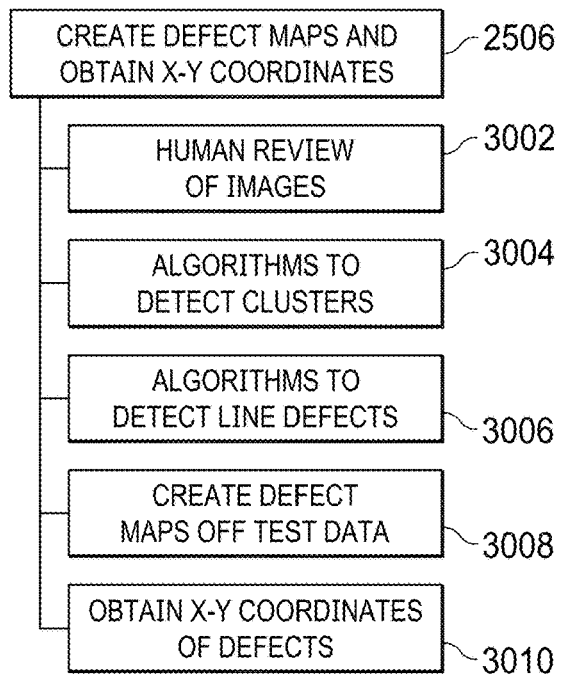
FIG. 30 is a block diagram of a defect map step associated with the flow chart of FIG. 25.

FIG. 30 shows a block diagram of further details of the defect map and (x-y) coordinate step 2506, including: human review of the images 3002, algorithms to detect clusters 3004, algorithms to detect line defects 3006, creating defect maps from test data 3008, and obtaining (x-y) coordinates of defects.

From the raw test data, defective pixels/lines are flagged. Binary or encoded defect maps are generated which provides a list of only defect locations. From these defect maps, the gate/data line of each defect can be inferred. A list of defective coordinates can be obtained.

Figure 31:
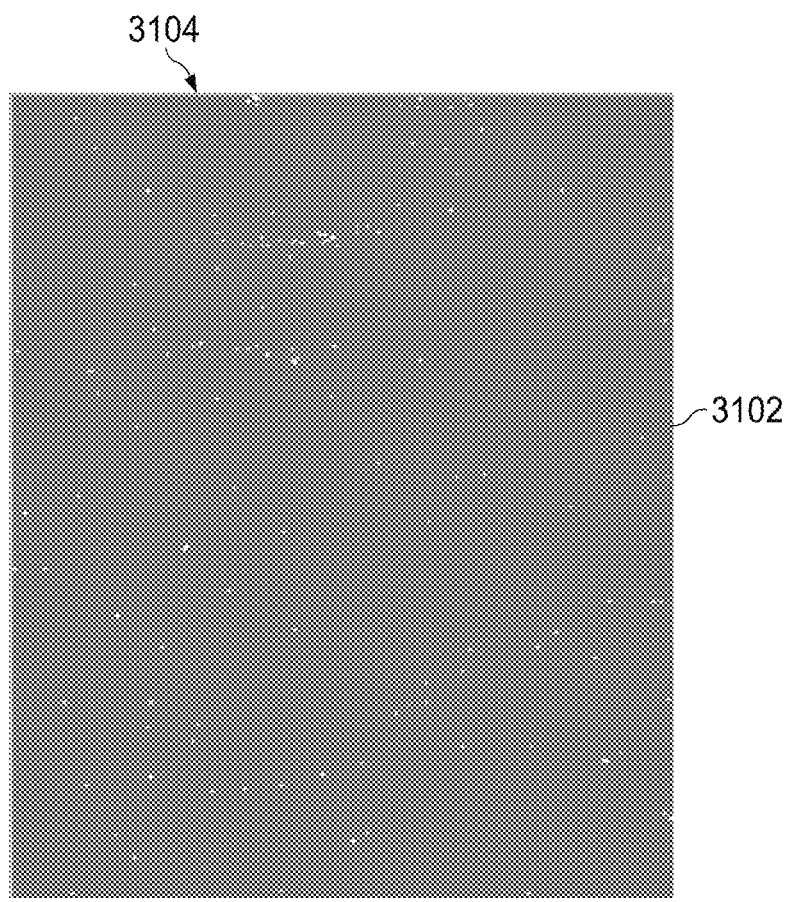
FIG. 31 is an image of a defect map associated with FIG. 30.

A defect map image 3102 is shown in FIG. 31, wherein the image 3102 is of the entire image sensor array, or a portion thereof. Location 3104 shows an area of the area including a group of defects.

Figure 32:
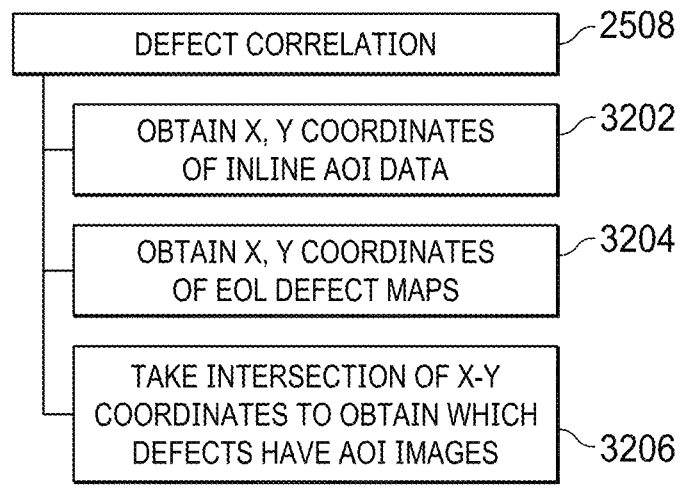
FIG. 32 is a block diagram of a defect correlation step associated with the flow chart of FIG. 25.

FIG. 32 shows a block diagram of further details of the defect correlation step 2508, including: obtaining (x,y) coordinates of in-line AOI data 3202, obtaining x,y coordinates of EOL defect maps, and taking the intersection to obtain which defects have AOI images.

Figure 33:
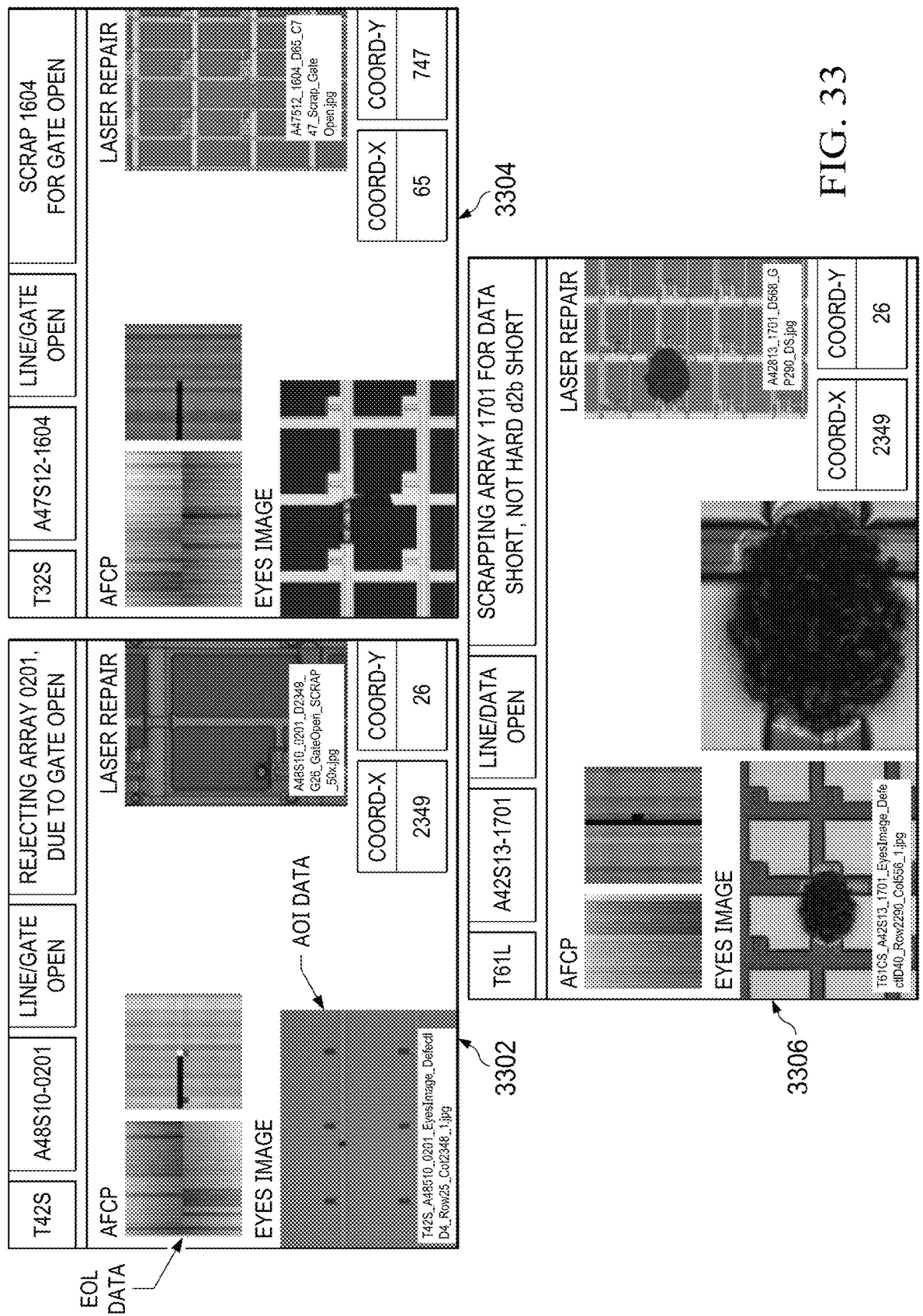
FIG. 33 is a series of example AOI images that correlate with defects in the defect map coordinates causing quality issues.

The list of (x,y) coordinates for all of the AOI in-line inspect steps is compared with the EOL defect map (x,y) coordinates to fine correlations. These correlations are the significant AOI images that affect product quality. FIG. 33 shows examples of AOI images which correlate with defects in defect map coordinates causing quality issues. A first example correlation 3302 shows "T42S", which is a Particle at the gate dielectric layer (Island) DI Module causing a gate open. A second example correlation 3304 shows "T32S", which is a Void in the Island DI film causing a Gate line open. A third example correlation 3306 shows "T61L", which is a Particle at the ITO DI module causing a cluster. While specific mask layers are referenced herein, with respective labels and descriptions, it will be appreciated by those skilled in the art that a completely different mask set with different labels and functions may be used for a different image sensor product or a different product that that described above.

Figure 34:
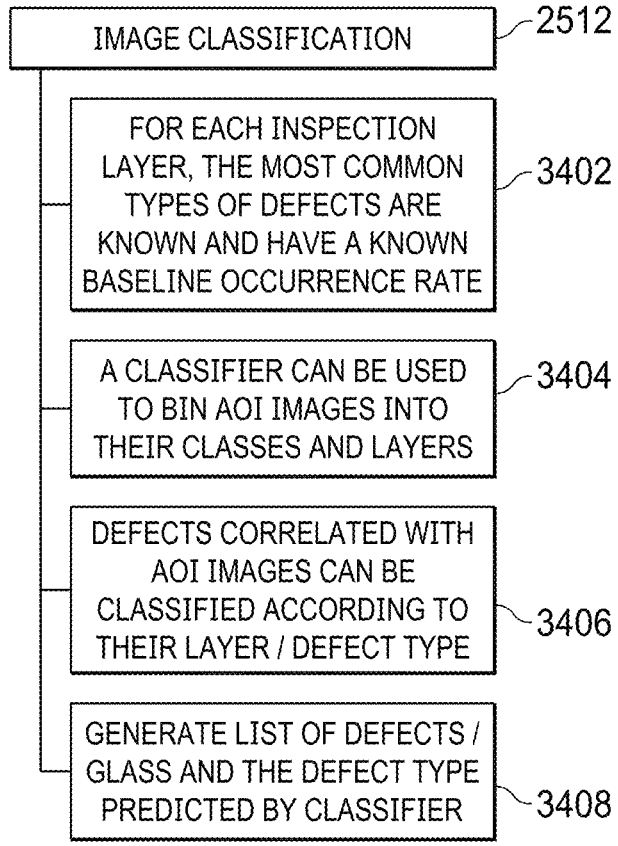
FIG. 34 is a block diagram of an image classifier step associated with the flow chart of FIG. 25.

The image classification step 2512 is shown in further detail in FIG. 34. This step has been previously described wherein blocks 3402, 3404, 340, and 3408 substantially correspond to blocks 1602, 1604, 1606, and 1608 shown in FIG. 16.

Figure 35:
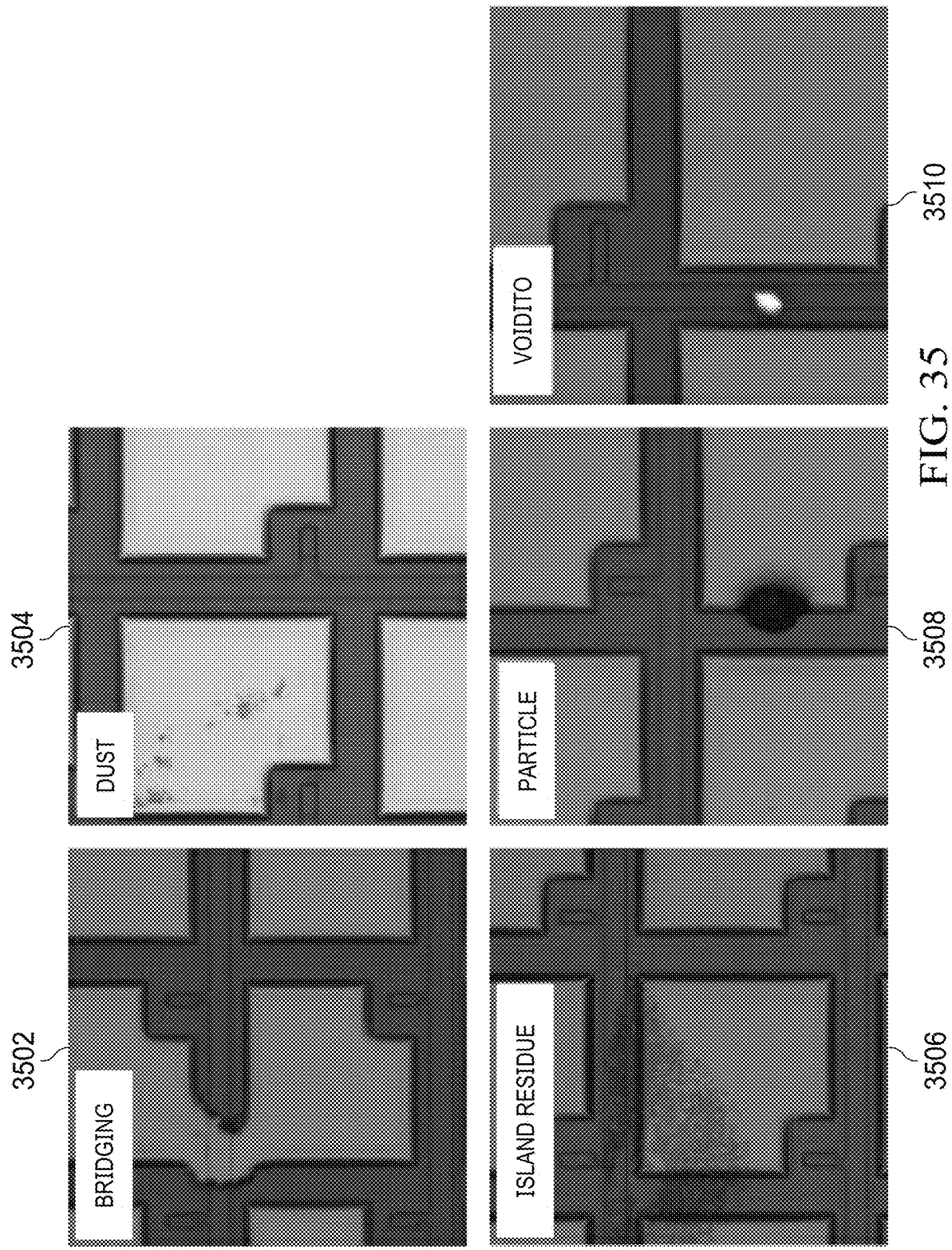
Figure 36:
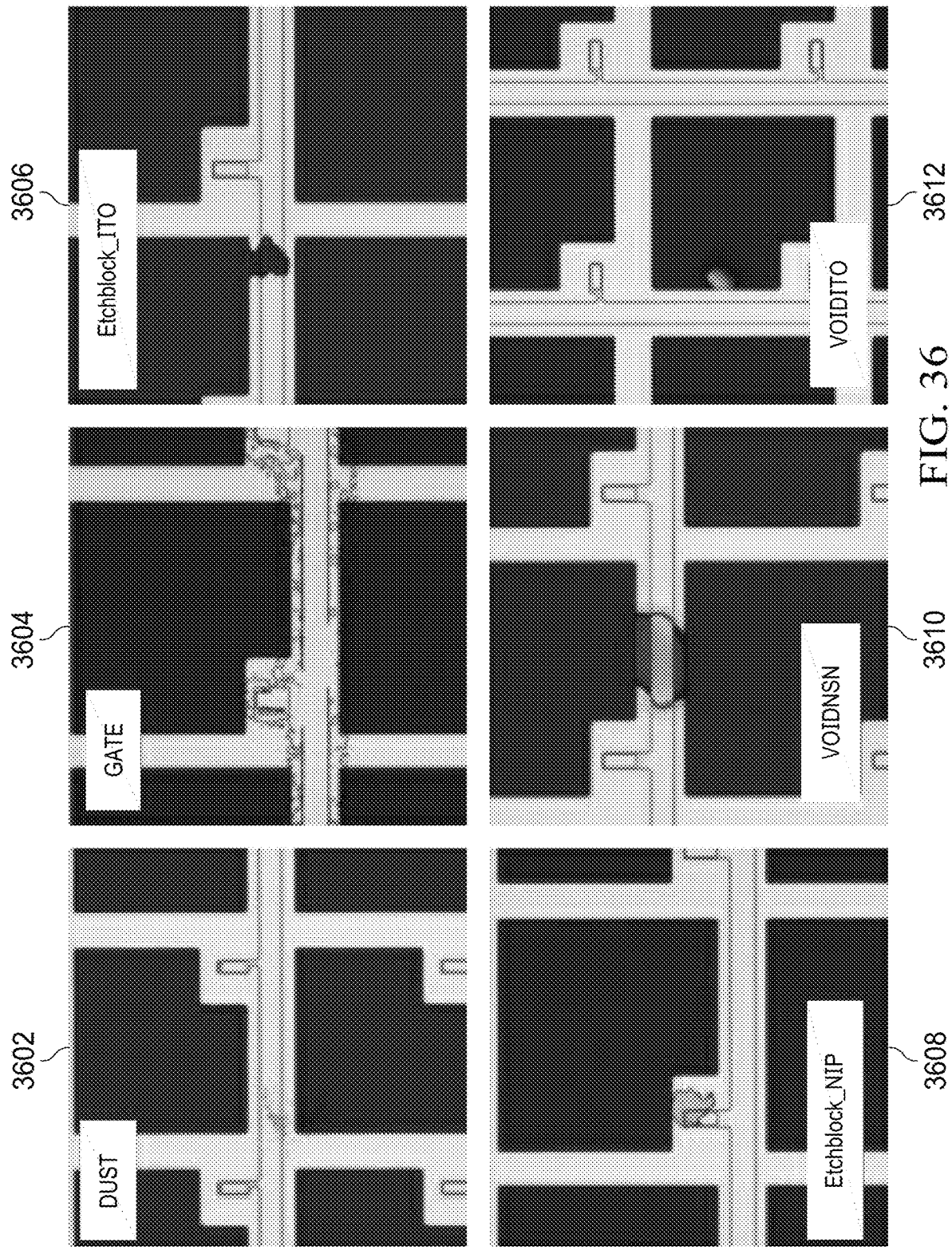
Figure 37:
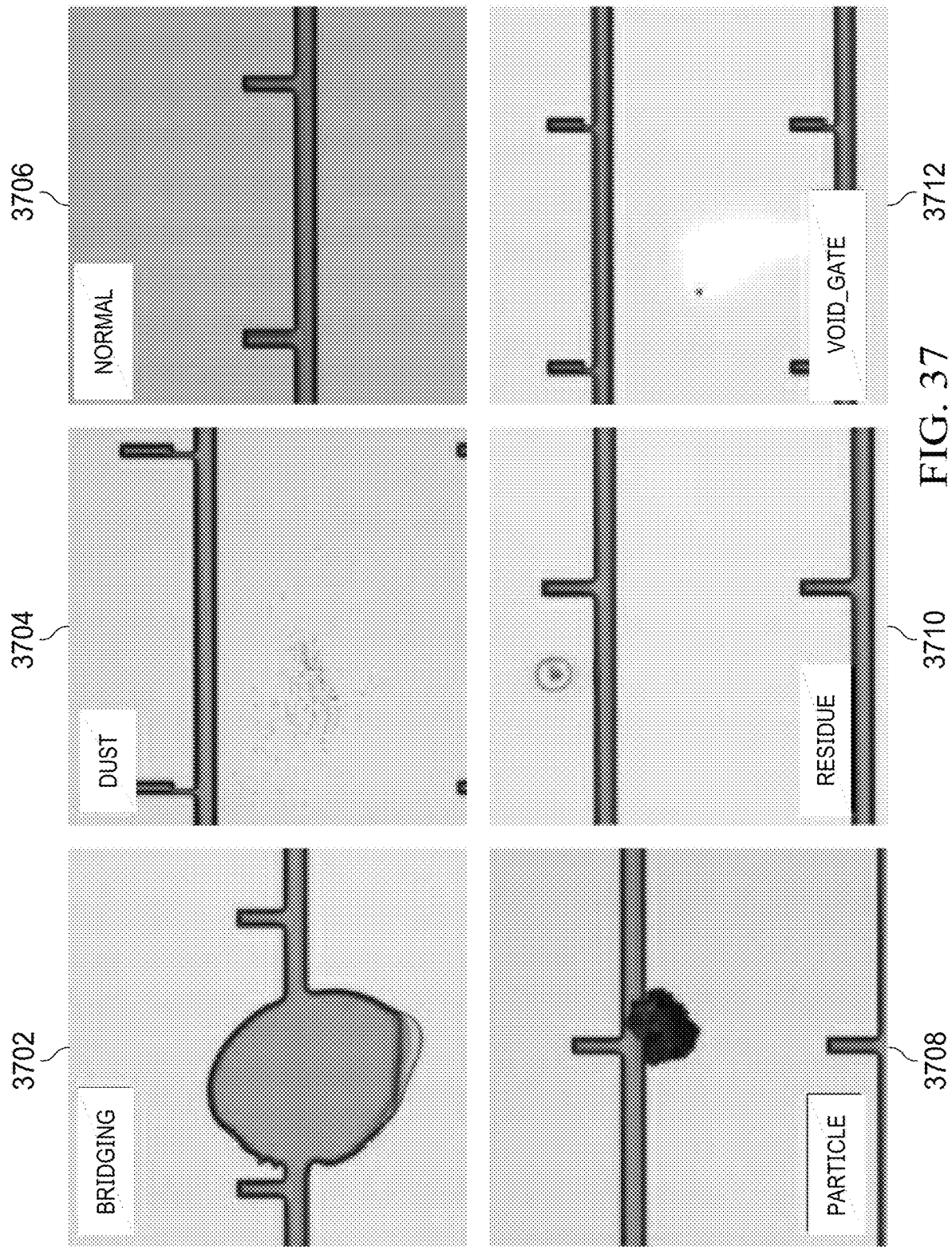
Figure 39:
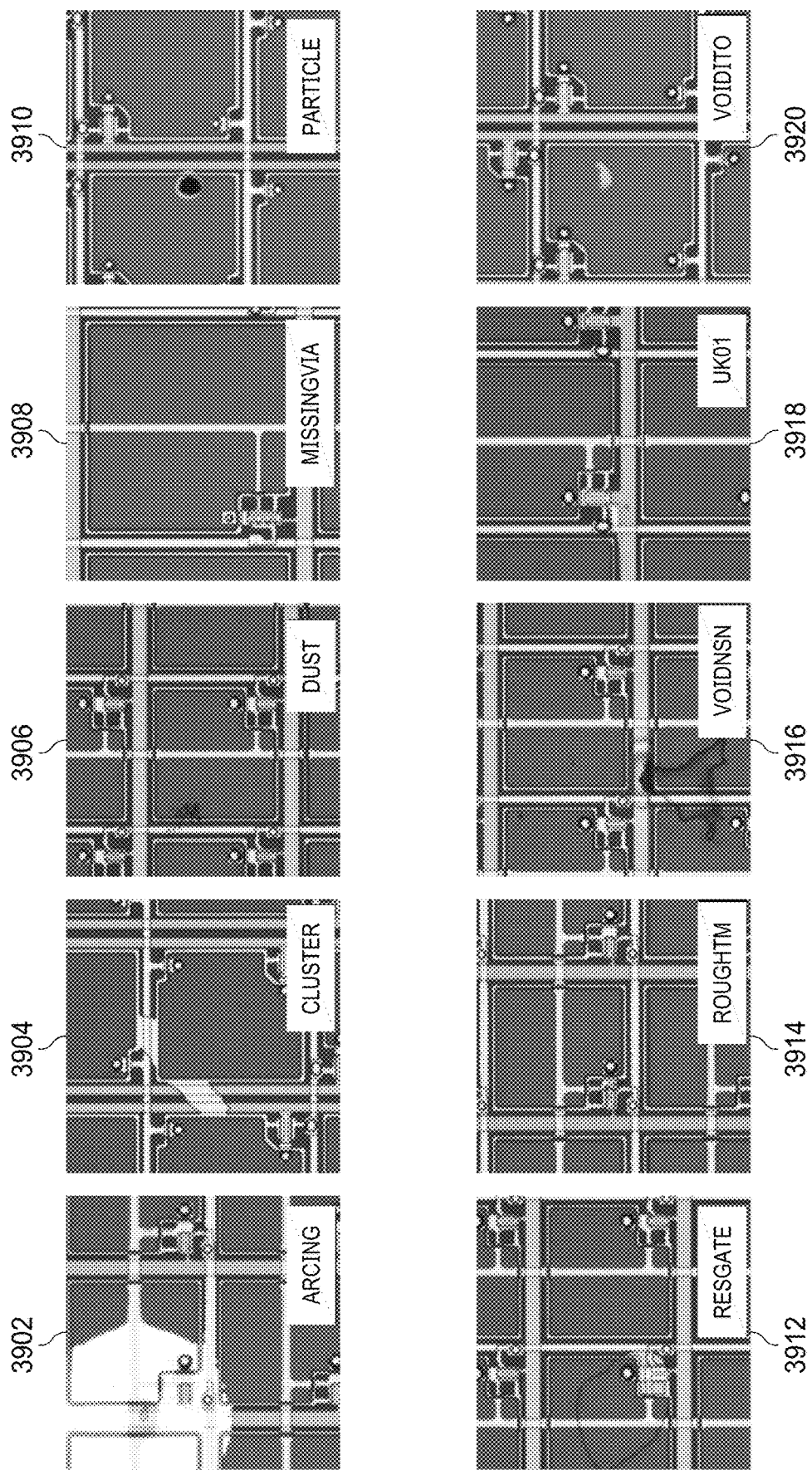

Similarly the classification bins of FIGS. 35 through 39 have been previously described and shown, but are reproduced here to show their location in the quality improvement flow. FIG. 35 corresponds to previous FIG. 17, wherein bins 3502, 3504, 3506, 3508, and 3510 correspond to bins 1702, 1704, 1706, 1708, and 1710. FIG. 36 corresponds to previous FIG. 18, wherein bins 3602, 3604, 3606, 3608, 3610, and 3612 correspond to bins 1802, 1804, 1806, 1808, 1810, and 1812. FIG. 37 corresponds to previous FIG. 19, wherein bins 3702, 3704, 3706, 3708, 3710, and 3712 correspond to bins 1902, 1904, 1906, 1908, 1910, and 1912. FIG. 38 corresponds to previous FIG. 20, wherein bins 3802, 3804, 3806, 3808, and 3810 correspond to bins 2002, 2004, 2006, 2008, and 2010. FIG. 39 corresponds to previous FIG. 21, wherein bins 3902, 3904, 3906, 3908, 3910, 3912, 3914, 3916, 3918, and 3920 correspond to bins 2102, 2104, 2106, 2108, 2110, 2112, 2114, 2116, 2118, and 2120.

Figure 40:
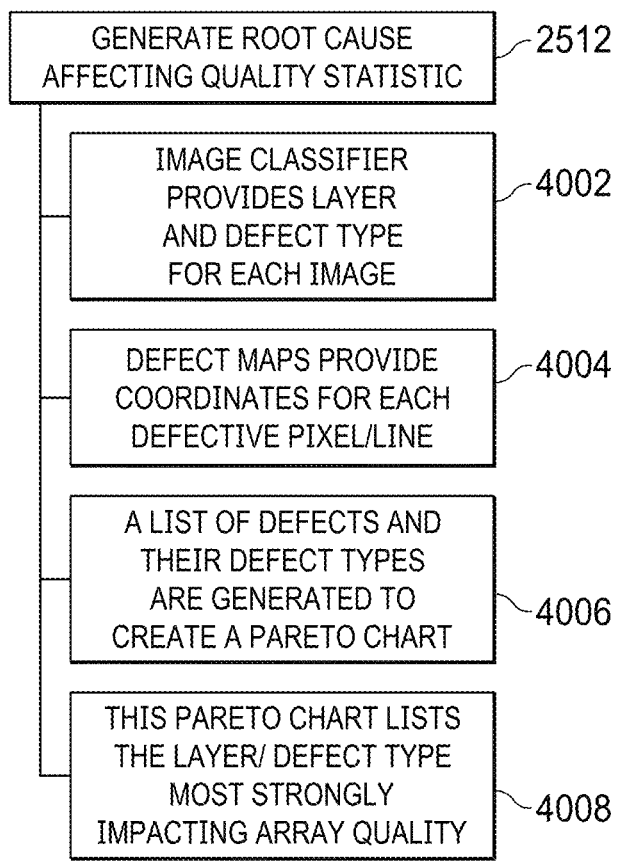
FIG. 40 is a block diagram of a root cause statistic step associated with the flow chart of FIG. 25.

The root cause statistic step 2512 is shown in further detail in the block diagram of FIG. 40 including: the image classifier provides the layer and defect type for each image 4002, defect maps are provided coordinates for each defective pixel/line 4004, a list of defects and their defect type are generated to create a Pareto chart 4006, and the Pareto chart list the layer/defect type most strongly impacting array quality.

Figure 41:
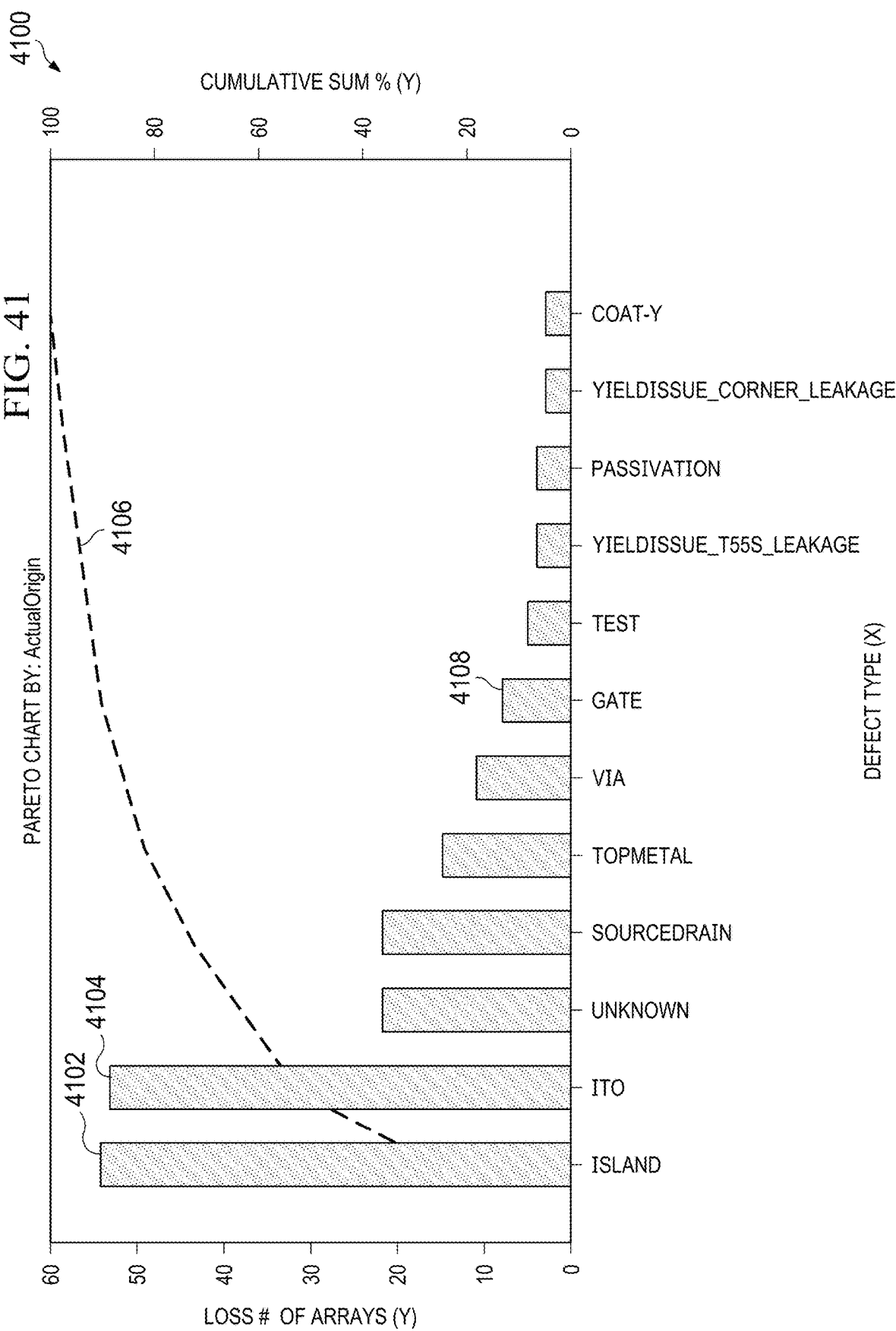
FIG. 41 is an example of a Pareto chart having significant defect information useful in improving the quality of an image sensor array product, according to an embodiment.

An example of a Pareto chart 4100 is shown in FIG. 41. Pareto chart 4100 shows on a first Y axis the loss of the number of image sensor arrays by defect type. A second Y axis shows the cumulative sum of the loss of the number of image sensor arrays 4106 as a percentage of 100% cumulative loss from all defects. Two important defect types 4102 and 4104 are shown, as well as an example less important defect type 4108. Other types of charts can be built to identify important defect types and to aid the manufacturing process.

Having the (x,y) coordinates of the defects affecting image quality from EOL data, having the (x,y) coordinates of all AOI flagged defects which affect image quality, having all of the AOI images classified in terms of inspection layer, defect type, and size, a Pareto chart which sorts the largest number of defect types occurring at each defect layer for each product can be built, which can in turn be used in quality control of a given product. For example, significant quality improvements can be made by taking steps to address the largest percentage identified defect type.

An in-line prediction method, and a quality improvement method for an image sensor product using machine learning have been described above. The purpose of the in-line prediction method is to produce a set of significant defect types, and to baseline their occurrence rates. The purpose of the quality improvement method is to identify the percentage of product failures associated with those significant defect types. These two methods can be used together or separately. For example, if significant defect types are already known based on manufacturing experience, the in-line prediction method need not be performed. Alternatively, the in-line prediction method could be done periodically to update the list of significant defect types over time.

Furthermore, while defect types associated with an image sensor products comprising an array of pixels manufactured on a glass substrate have been shown and described, it will be clear to those skilled in the art that many other defect types can be used as might be required for a particular product, and a particular manufacturing process. While a TFT based image sensor array has been described in conjunction with an embodiment system and in-line prediction, and quality improvement methods, other types of imaging products can be used as well, including those using numerous different technologies for manufacturing the imaging pixels.

Many modifications and alternatives to those embodiments described herein can be made. For example, the convolution network may be of various depths, and may be of various input sizes for images that have been reduced in size, down-sampled, or cropped to various dimensions, or which have multiple channels. A single Convolutional Neural Network, or multiple Convolutional Neural Networks may be used in conjunction with each other for classification of the various images from various layers. Defect images may be preprocessed prior to classification, including cropping, down-sampling, rotating, changing color space, applying low or high pass filtering, as well as many other pre-processing operations for those skilled in the art. Other products (other than image sensor arrays) could take advantage of the systems and methods described above including, for example, semiconductor products wherein both visual inspection and electrical testing are important components to product quality.

It is an advantage that, according to embodiments, only computer resources are required for classification, thus minimizing the use of human resources in searching for a root cause, and inconsistencies with prior classification methods. It is a further advantage that all defects can be analyzed for a failing array, using a defined hierarchy, and not just a single or handful of defects that were able to be analyzed using prior classification methods. It is a further advantage that new defects can be added to a library of defects easily using the pre-trained neural network, according to embodiments.

In summary, the method and system of embodiments exploit statistical root cause failure analysis. Embodiment methods connect end of line functional defects with in-line AOI data to classify defects in an image sensor product to their corresponding origin. As a result, those manufacturing processes which have a strong impact on product performance may be demonstrated statistically.

The system and method, according to embodiments, can be used to improve yield of targeted products by reducing the occurrence of defects, and by reducing the severity of defective lines and pixels. The system and method, according to embodiments, can also be used to reduce the cost of arrays to customers, while also improving the quality.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A classification system of root cause failure in an image sensor array comprising:
    an optical inspection system for generating optical inspection data of the image sensor array;
    a tester for generating electrical test data of the image sensor array; and
    a computer system configured for:
    generating two dimensional coordinates of optical defects present in the optical inspection data;
    generating two dimensional coordinates of electrical failures in the electrical test data;
    correlating defects between the optical defects and the electrical failures;
    classifying the correlated defects; and
    providing root cause data based on the classified correlated defects,
    wherein classifying the correlated defects is performed with a convolutional neural network comprising an input layer, a plurality of hidden layers, and an output layer.

2. The classification system of claim 1, wherein the optical inspection system comprises an automatic optical inspection system.

3. The classification system of claim 1, wherein the tester comprises an interface for testing the image sensor array.

4. The classification system of claim 1, wherein the computer system comprises a processor.

5. The classification system of claim 1, wherein the computer system comprises a machine learning system.

6. The classification system of claim 1, wherein the computer system is configured for preprocessing of the inspection data.

7. An in-line prediction method for an image array of sensors comprising:
    collecting in-line optical inspection data of the image array of sensors;
    passing the optical inspection data through an image classifier to generate a plurality of defect types;
    selecting defect types that most strongly affect manufacturing yield of the image array;
    generating a pass/fail prediction based on the selected defect types; and
    using an AI network as the image classifier to generate the plurality of defect types, wherein the AI network comprises an input layer, a plurality of hidden layers, and an output layer.

8. The in-line prediction method of claim 7, further comprising using an automated optical inspection system for collecting the in-line optical inspection data of the image array.

9. The in-line prediction method of claim 7, wherein selecting the defect types that most strongly affect manufacturing yield of the image array comprise selecting the defect types based on pre-existing failure analysis data.

10. The in-line prediction method of claim 7, wherein generating the pass/fail prediction comprises reviewing a subset of the selected defect types.

11. A quality improvement method for an image sensor, the method comprising:
    collecting in-line optical inspection data of the image sensor;
    collecting end of line electrical test data of the image sensor;
    creating defect maps and obtaining x-y coordinates of the optical inspection data and the electrical test data;
    correlating the defect maps to generate correlated defects;
    classifying the images of the correlated defects; and
    generating root cause statistics of the classified correlated defects,
    wherein classifying the images is performed by an AI network, and wherein the AI network comprises an input layer, a plurality of hidden layers, and an output layer.

12. The method of claim 11, wherein collecting the in-line optical inspection data is performed automatically by an automatic optical inspection system.

13. The method of claim 11, wherein collecting end of line electrical data comprises collecting test, light, lag, and sensitivity images.

14. The method of claim 11, wherein creating defect maps and obtain x-y coordinates comprises creating defect maps of cluster defects, and line defects, and obtaining x-y coordinates of the cluster defects and line defects.

15. The method of claim 11, wherein correlating the defect maps comprises obtaining an intersection of the x-y coordinates of the defect maps.

16. The method of claim 11, wherein generating root cause statistics comprising generating a Pareto chart listing a layer and a defect type most strongly impacting the yield of an array including the image sensor.

* * * * *